US012755376B2

(12) United States Patent
Zhao et al.

(10) Patent No.: US 12,755,376 B2
(45) Date of Patent: Oct. 6, 2026

(54) USING A THERMAL CAMERA FOR DETECTION OF ARTHRITIS

(71) Applicants: Seattle Children's Hospital, Seattle, WA (US); University of Washington, Seattle, WA (US)

(72) Inventors: Yongdong Zhao, Redmond, WA (US); Joshua Scheck, Seattle, WA (US); Savannah Corrina Partridge, Seattle, WA (US); Ramesh S. Iyer, Sammamish, WA (US); Mahesh Thapa, Seattle, WA (US); Debosmita Biswas, Seattle, WA (US); Nivrutti Vasudev Bhide, Wenatchee, WA (US); Kevin Charles Cain, Seattle, WA (US); Jason Michael Pyke, Bellevue, WA (US)

(73) Assignees: Seattle Children's Hospital, Seattle, WA (US); University of Washington, Seattle, WA (US)

( * ) Notice: Subject to any disclaimer, the term of this patent is extended or adjusted under 35 U.S.C. 154(b) by 268 days.

(21) Appl. No.: 18/343,419

(22) Filed: Jun. 28, 2023

(65) Prior Publication Data

US 2024/0005496 A1 Jan. 4, 2024

Related U.S. Application Data

(60) Provisional application No. 63/356,977, filed on Jun. 29, 2022.

(51) Int. Cl.

| | |
|---|---|
| *G06T 7/00* | (2017.01) |
| *G06T 7/12* | (2017.01) |
| *H04N 23/23* | (2023.01) |

(52) U.S. Cl.
CPC .............. *G06T 7/0012* (2013.01); *G06T 7/12* (2017.01); *H04N 23/23* (2023.01); *G06T 2207/10048* (2013.01); *G06T 2207/20076* (2013.01)

(58) Field of Classification Search
None
See application file for complete search history.

(56) References Cited

U.S. PATENT DOCUMENTS

2021/0338148 A1* 11/2021 Marine ................ A61B 5/0004

* cited by examiner

*Primary Examiner* — Mark R Milia
(74) *Attorney, Agent, or Firm* — CHRISTENSEN O'CONNOR JOHNSON KINDNESS PLLC

(57) ABSTRACT

A method for determining a presence of arthritis in a patient, including obtaining a first image of a patient's joint, wherein the first image is a visible light image, obtaining a second image of the patient's joint, wherein the second image is a thermal light image, determining an outline of the patient's joint from the first image, determining an outline of a reference area from the first image, wherein the patient's joint is adjacent to the reference area, determining a first representative topological temperature within the outline of the patient's joint of the first image from the second image, determining a second representative topological temperature within the outline of the reference area of the first image from the second image, comparing the first representative topological temperature and the second representative topological temperature; and determining a likelihood of the presence of arthritis within the patient's joint.

17 Claims, 10 Drawing Sheets
(9 of 10 Drawing Sheet(s) Filed in Color)

USING A THERMAL CAMERA FOR DETECTION OF ARTHRITIS

CROSS REFERENCE TO RELATED APPLICATION

This application claims priority to U.S. Provisional Application No. 63/356,977, filed Jun. 29, 2022, the entire disclosure of which is hereby incorporated by reference.

BACKGROUND

Juvenile idiopathic arthritis (JIA) is the most common rheumatic disease in children. The most affected joints are knees and ankles, followed by wrists and elbows. Early diagnosis and aggressive treatment are critical for maintaining normal joint functions in the management of JIA. A joint exam performed by a pediatric rheumatologist is considered standard assessment for children with JIA. Musculoskeletal ultrasound is more sensitive in detecting joint synovitis than physical exam but may also be limited by accessibility to equipment and by operators.

Infrared thermal imaging is a quick and noninvasive tool that can detect temperatures of different body parts with precision. It has been evaluated as a screening or supplementary tool for detecting or following up active arthritis in animal models, osteoarthritis, rheumatoid arthritis, and JIA. Studies focusing on larger joints (knees, ankles, wrists) defined regions of interest (ROIs) based on anatomic location and reported absolute temperatures for comparison. Further studies show significantly higher temperatures in inflamed ankles than controls but fail to confirm the difference between inflamed and healthy knee joints. Heat distribution index (HDI) has been reported as another approach with a cutoff of 1.3° C. to distinguish active arthritis in finger joints and wrists with a sensitivity of 67% and a specificity of 100%. Studies have used the difference between inflamed joints and adjacent tissues in patients with symmetric arthritis. The temperature difference was associated with disease activity score. However, "adjacent tissue" is generally not clearly defined.

There exists a need for detecting arthritis in joints with an enhanced sensitivity and reliability of detecting arthritis by using a within-limb calibration for thermal imaging analysis. Conventional technologies cannot be used to determine the threshold using within-limb calibration in children with known arthritis, and these methods remain unvalidated in new patients.

Accordingly, methods and systems for detecting arthritis in joints are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, disclosed herein is a method for determining a presence of arthritis in a patient includes obtaining an image of the patient's joint, where the image is a thermal light image. The method also includes determining an outline of the patient's joint from the image, determining an outline of a reference area from the image, where the patient's joint is adjacent to the reference area, and determining a first representative topological temperature within the outline of the patient's joint. The method further includes determining a second representative topological temperature within the outline of the reference area, comparing the first representative topological temperature and the second representative topological temperature, and determining a likelihood of the presence of arthritis within the patient's joint.

In another embodiment, disclosed herein is a method for determining a likelihood of a presence of arthritis in a patient, includes obtaining a first image of a patient's joint, wherein the first image is a visible light image, obtaining a second image of the patient's joint, wherein the second image is a thermal light image. The method further includes determining an outline of the patient's joint from the first image, determining an outline of a reference area from the first image, where the patient's joint is adjacent to the reference area. The method also includes determining a first representative topological temperature within the outline of the patient's joint of the first image from the second image, determining a second representative topological temperature within the outline of the reference area of the first image from the second image, comparing the first representative topological temperature and the second representative topological temperature, and determining the likelihood of the presence of arthritis within the patient's joint.

In yet another embodiment, disclosed herein is a system for determining a likelihood of a presence of arthritis in a patient, includes a first camera configured to obtain a first image of a patient's joint, where the first image is a visible light image, a second camera configured to obtain a second image of the patient's joint, where the second image is a thermal light image, and a processor communicatively coupled to the first and second camera. The processor is configured to determine an outline of the patient's joint from the first image, determine an outline of a reference area from the first image, where the patient's joint is adjacent to the reference area, determine a first representative topological temperature within the outline of the patient's joint of the first image from the second image, determine a second representative topological temperature within the outline of the reference area of the first image from the second image, compare the first representative topological temperature and the second representative topological temperature, and determine the likelihood of the presence of arthritis within the patient's joint.

DESCRIPTION OF THE DRAWINGS

This patent or application file contains at least one drawing executed in color. Copies of this patent or patent application publication with color drawing(s) will be provided by the Office upon request and payment of the necessary fee.

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
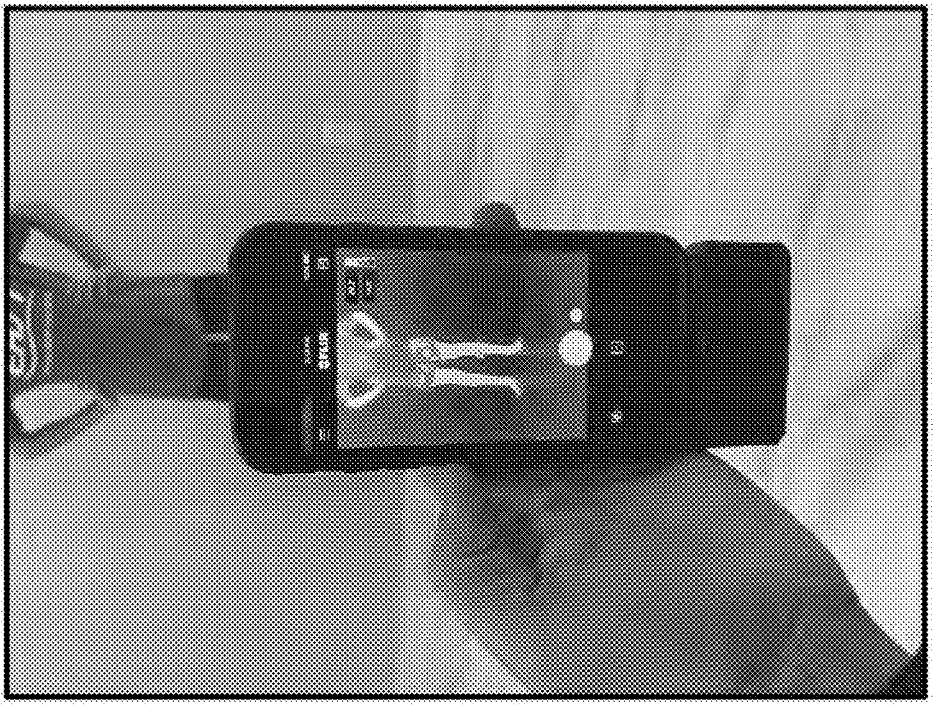
FIG. 1A shows acquisition of a Forward Looking Infra-Red (FLIR) image, in accordance with the present technology.

While illustrative embodiments have been illustrated and described, it will be appreciated that various changes can be made therein without departing from the spirit and scope of the technology.

In one aspect, disclosed herein is a method for determining a presence of arthritis in a patient includes obtaining an image of the patient's joint, where the image is a thermal light image. The method also includes determining an outline of the patient's joint from the image, determining an outline of a reference area from the image, where the patient's joint is adjacent to the reference area, and determining a first representative topological temperature within the outline of the patient's joint. The method further includes determining a second representative topological temperature within the outline of the reference area, comparing the first representative topological temperature and the second representative topological temperature, and determining a likelihood of the presence of arthritis within the patient's joint.

In some embodiments, the method further comprises obtaining a second image, wherein the second image is a visible light image, wherein when a second image is obtained, the outline of the patient's joint and the outline of a reference area are determined from the second image. In some embodiments, the first image and the second image are acquired simultaneously with a single camera.

In some embodiments, the first representative topologic temperature is a percentile, an average, a mean, a median, or a maximum temperature within the outline of the patient's joint. In some embodiments, the second representative topologic temperature is a percentile, an average, a mean, a median, or a maximum temperature within the outline of the patient's joint. In some embodiments, comparing the first and second topological temperature comprises subtracting the first topological temperature from the second topological temperature. In some embodiments, comparing the first and second topological temperature comprises forming a ratio between the first topological temperature and the second topological temperature.

In some embodiments, the joint is selected from a group consisting of a knee, a finger joint, an ankle, a wrist, an elbow, and a toe joint.

In another aspect, disclosed herein a method for determining a likelihood of a presence of arthritis in a patient, includes obtaining a first image of a patient's joint, wherein the first image is a visible light image, obtaining a second image of the patient's joint, wherein the second image is a thermal light image. The method further includes determining an outline of the patient's joint from the first image, determining an outline of a reference area from the first image, where the patient's joint is adjacent to the reference area. The method also includes determining a first representative topological temperature within the outline of the patient's joint of the first image from the second image, determining a second representative topological temperature within the outline of the reference area of the first image from the second image, comparing the first representative topological temperature and the second representative topological temperature, and determining the likelihood of the presence of arthritis within the patient's joint.

In some embodiments, the first image and the second image are acquired simultaneously with a single camera. In some embodiments, the first image and the second image are acquired simultaneously with a set of cameras.

In some embodiments, the first representative topologic temperature is a percentile, average, mean, median, or maximum temperature within the outline of the patient's joint. In some embodiments, the second representative topologic temperature is percentile, average, mean, median, or maximum temperature within the outline of the patient's joint. In some embodiments, comparing the first and second topological temperature comprises subtracting the first topological temperature from the second topological temperature. In some embodiments, comparing the first and second topological temperature comprises forming a ratio between the first and the second topological temperature. In some embodiments, comparing the first and second topological temperature comprises determining a percentage of the first topological temperature to the second topological temperature.

In some embodiments, the joint is selected from a knee, a finger, an ankle, and a hip.

In some embodiments, the joint is selected from a group consisting of a knee, a finger, an ankle, a wrist, an elbow, and a toe joint, but the joint may be any joint of a human or animal. In some embodiments, determining an outline of the patient's joint from the first image comprises identifying a first joint of the patient, identifying a second joint of the patient, dividing an area between the first joint and the second joint into a plurality of parts, wherein each part of the plurality of parts are equal in size, reflecting a first part of the plurality of parts along a line at a first reference point, combining the first part and the reflected first part into a contiguous area, assigning the contiguous area as the patient's joint; and defining an outline of the contiguous area as the outline of the patient's joint. In some embodiments, determining an outline of a reference area from the first image comprises assigning a middle part of the plurality of parts as the reference area, wherein when the plurality of parts is an even number of parts, the middle part is two middle parts combined as a contiguous middle part, and defining an outline of the middle part as the outline of the reference area. For example, if the area is divided into four parts, the second and third part would be combined into the contiguous middle part. In some embodiments, the first reference point is a knee of the patient, and the second reference point is an ankle of the patient, but the first reference point may be any joint of interest, and the second reference point may be any adjacent joint, such as an ankle and a knee, an elbow and a wrist, a wrist and an elbow, a first finger joint and a second finger joint, etc.

In yet another aspect, disclosed herein is a system for determining a likelihood of a presence of arthritis in a patient, includes a first camera configured to obtain a first image of a patient's joint, where the first image is a visible light image, a second camera configured to obtain a second image of the patient's joint, where the second image is a thermal light image, and a processor communicatively coupled to the first and second camera. The processor is configured to determine an outline of the patient's joint from the first image, determine an outline of a reference area from the first image, where the patient's joint is adjacent to the reference area, determine a first representative topological temperature within the outline of the patient's joint of the first image from the second image, determine a second representative topological temperature within the outline of the reference area of the first image from the second image, compare the first representative topological temperature and the second representative topological temperature, and determine the likelihood of the presence of arthritis within the patient's joint.

In some embodiments, the first camera and the second camera are a single camera. In some embodiments, the first camera, the second camera, and the processor are located on a smart device. Still, in some embodiments, the first camera and the second camera are configured to take the first and second image simultaneously.

In some embodiments, the first representative topologic temperature is a percentile, average, mean, median, or maximum temperature within the outline of the patient's joint. In some embodiments, the second representative topologic temperature is a percentile, average, mean, median, or maximum temperature within the outline of the patient's joint.

In some embodiments, the processor is further configured to identify a first joint of the patient and a second joint of the patient, divide an area between the first joint and the second joint into a plurality of parts, wherein each part of the plurality of parts are equal in size, reflect a first part of the plurality of parts along a line at a first reference point, combining the first part and the reflected first part into a contiguous area, assign the contiguous area as the patient's joint; and define an outline of the contiguous area as the outline of the patient's joint. In some embodiments, the processor is further configured to determine an outline of a reference area from the first image comprises assigning a middle part of the plurality of parts as the reference area, wherein when the plurality of parts is an even number of parts, the middle part is two middle parts combined as a contiguous middle part and define an outline of the middle part as the outline of the reference area. For example, if the area is divided into four parts, the second and third part would be combined into the contiguous middle part. In some embodiments, the first reference point is a knee of the patient, and the second reference point is an ankle of the patient, but the first reference point may be any joint of interest, and the second reference point may be any adjacent joint, such as an ankle and a knee, an elbow and a wrist, a wrist and an elbow, a first finger joint and a second finger joint, etc.

In some embodiments, existing computer vision libraries like OpenCV and human pose estimation models like MediaPipe are leveraged to automate the detection of temperature changes between anatomical regions of interest. In an example, a pipeline was designed that first entails extracting embedded thermal and visible light images from an image obtained by a thermal camera like a FLIR ONE PRO. The extracted embedded thermal image, however, typically has a lower resolution and encompasses a subset of the space obtained by the visible light image. These differences are resolved using co-registration. This involves apply Canny edge detection to identify edges for both images and iteratively resize and template match the edges for the visible light image against the edges for the thermal image until an optimal fit is identified using a suitable template matching metric or other matching objective function as is known to those skilled in the art. The co-registration process results in a modified (or transformed) visible light image that shares the same dimensions and approximately the same space as the thermal image. Joint locations are then labeled in the visible light image using MediaPipe and contours drawn around the body of the person obtained in the image. In other embodiments, machine learning models may be trained using a plurality of thermal image training data so that the foregoing joint and contour localization is conducted directly in the thermal image space rather than in the visible light image space. The distance between labeled joint locations are used to partition the contours into regions of interest (ROI). Masks are then generating for each region, where the coordinates of the boundary for each ROI are used to generate a filled polygon in its respective mask. To extract the pixels for each region of interest, bitwise operations are conducted on the ROI's mask and the thermal image. Representative pixels are then retrieved from each ROI. The ROI is then calibrated against the calibration region (one of the ROIs).

Figure 1B:
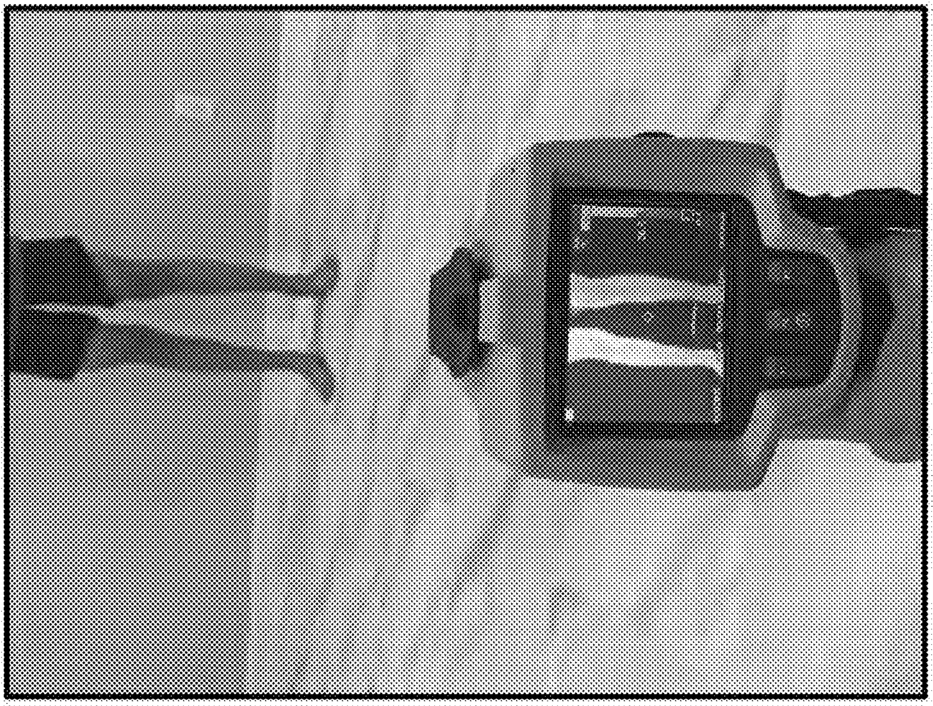
FIG. 1B shows acquisition of a Fluke image, in accordance with the present technology.

Turning now to the FIGURES, FIG. 1A shows acquisition of a Forward Looking InfraRed (FLIR) image, in accordance with the present technology. In some embodiments, one or both of the first and/or the second image are obtained with a FLIR camera, such as shown in FIG. 1A. In some embodiments, the FLIR camera may be integrated into a smart device. In some embodiments, the FLIR camera may be an attachment for a smart device. In some embodiments, the FLIR camera may be configured to take both the first and the second image. FIG. 1B shows acquisition of a Fluke image, in accordance with the present technology. In some embodiments, one or both of the first image and/or the second image are obtained with a Fluke camera, such as shown in FIG. 1B.

Figure 2:
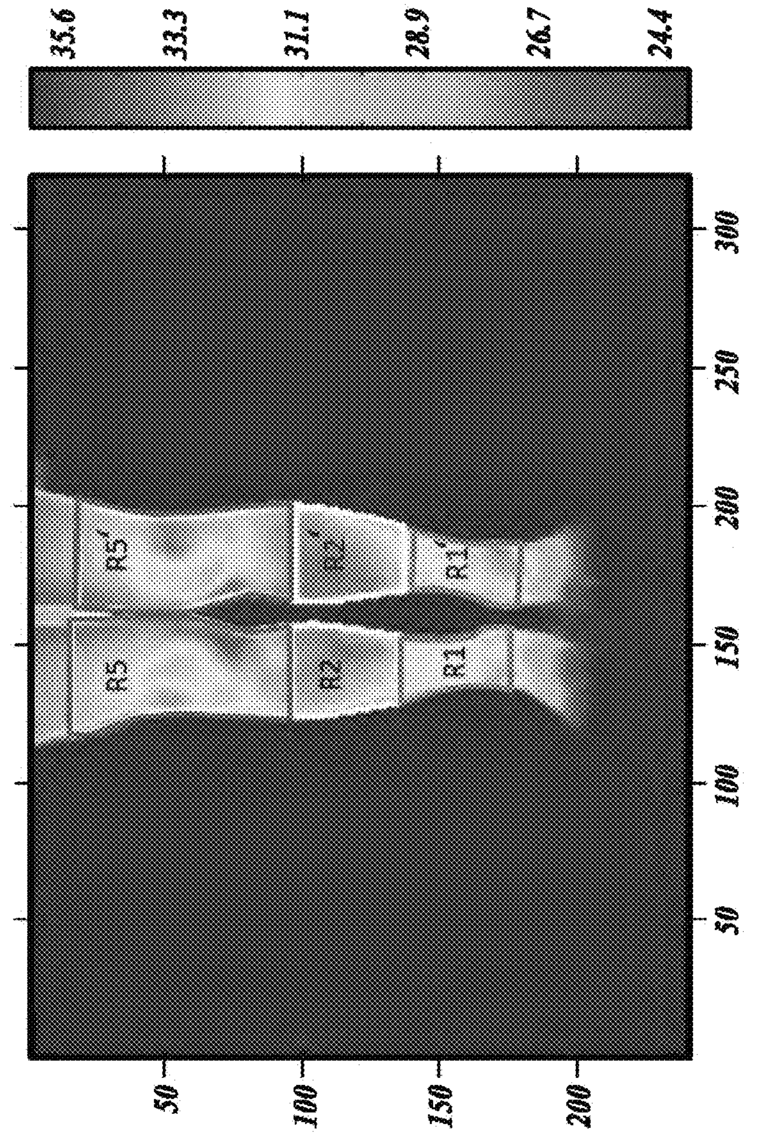
FIG. 2 is a representative thermal image of a patient without arthritis, in accordance with the present technology.

FIG. 2 is a representative thermal image of a patient without arthritis, in accordance with the present technology. In some embodiments, the thermal image shown in FIG. 2 is taken with a thermal camera, for example, a Fluke camera or a FLIR camera. In some embodiments, the thermal image of FIG. 2 may be the second image as described herein. On the horizontal axis and the left-hand vertical axis is representational distance. On the right-hand vertical axis is temperature in ° C. FIG. 2 shows a healthy patient, i.e., not having arthritis. The patient's right leg has been divided into three regions of interest (ROI), R1, R2, and R5 as described in detail in FIGS. 5A-5C. In some embodiments, the patient's left leg is also divided into ROI, illustrated here as R1', R2', and R5'.

Figure 3A:
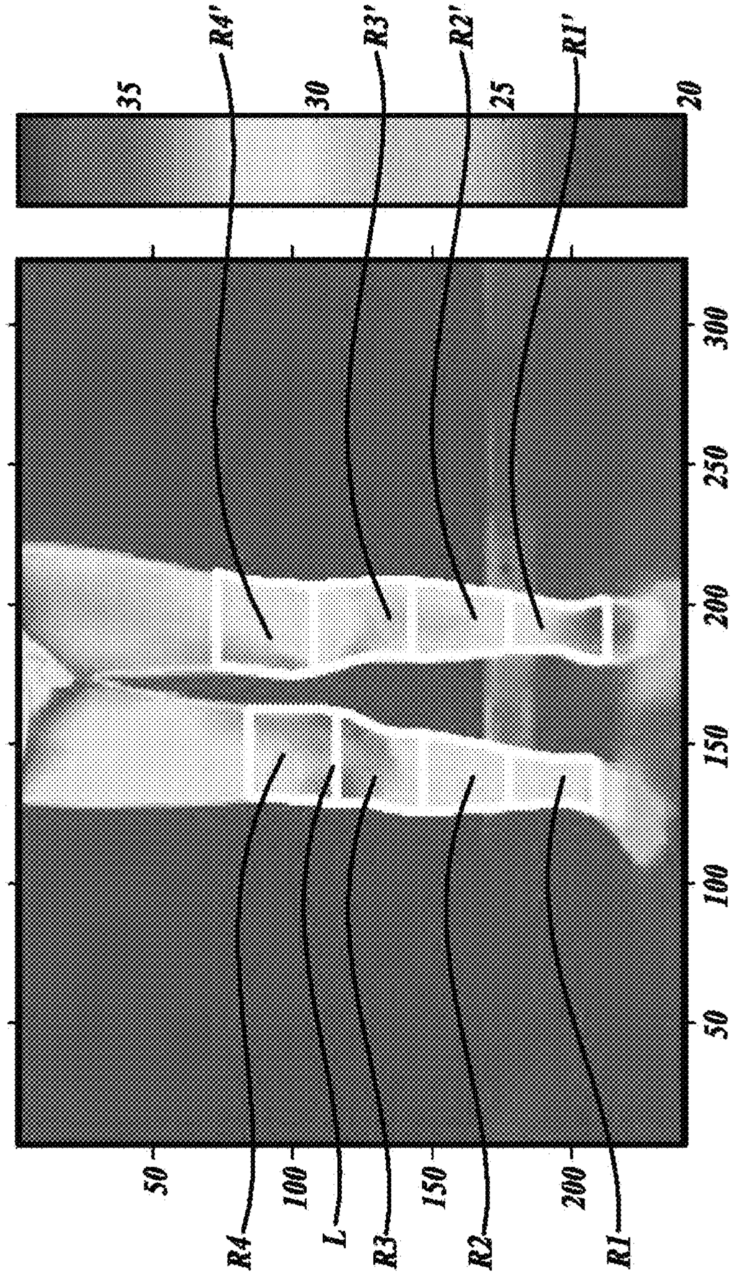
FIG. 3A is a representative thermal image of a patient with arthritis, in accordance with the present technology.
Figure 3C:
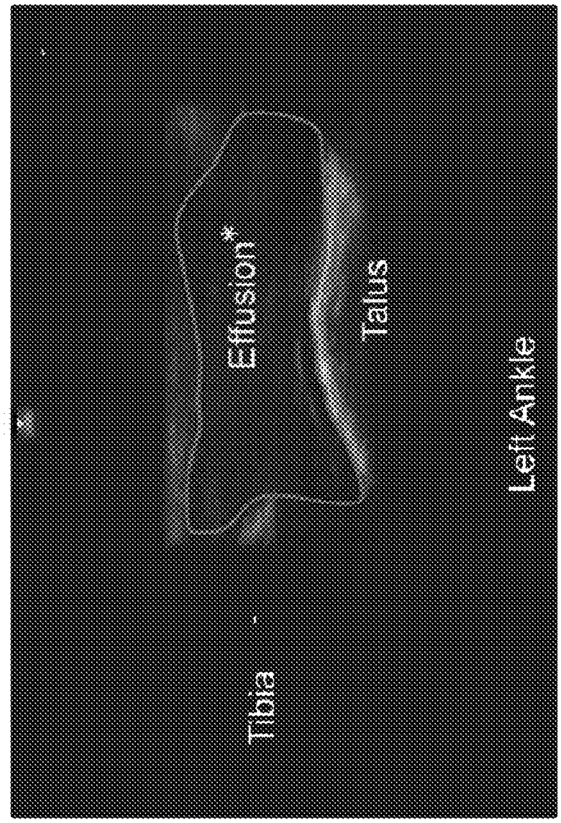
FIG. 3C is an ultrasound image of the left ankle of the patient in FIG. 3A, in accordance with the present technology.
Figure 3B:
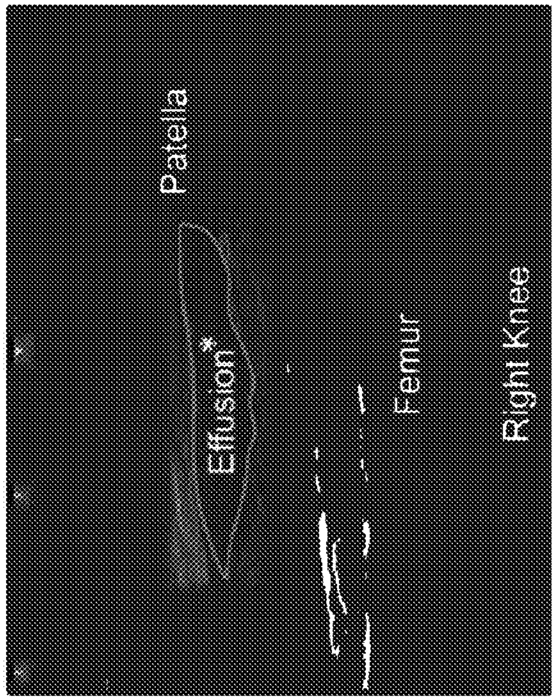
FIG. 3B is an ultrasound image of the right knee of the patient in FIG. 3A, in accordance with the present technology.

FIG. 3A is a representative thermal image of a patient with arthritis, in accordance with the present technology. In some embodiments, the thermal image shown in FIG. 2 is taken with a thermal camera, for example, a Fluke camera or a FLIR camera. In some embodiments, the thermal image of FIG. 2 may be the second image as described herein. On the horizontal axis and the left-hand vertical axis is representational distance. On the right-hand vertical axis is temperature in ° C. Also shown in FIG. 3A are regions of interest (ROI) of the right leg (R1, R2, R3, R4) and the left leg (R1', R2', R3', R4'). In some embodiments, the ROI are mirrored between the two limbs (right and left leg) of the patient. These ROI may be created based on the methods and systems disclosed herein and are described in detail in FIGS. 5A-5C. In some embodiments, an outline from the knee of a patient to the ankle of a patient is detected. Then, the area detected is divided into three equal ROI (R1, R2, and R3 or R1', R2', R3'). In some embodiments, the third ROI (R3 and/or R3') is then duplicated and reflected over line L. In some embodiments, line L represents a joint (here the knee) of the patient. While the joints imaged in FIGS. 3A-3C are ankles and knees, it should be understood that arthritis in any joint may be imaged and detected, including wrists, elbows, shoulders, finger, toes, and the like. As shown in FIG. 3A, the patient has a higher temperature at both the right knee and the left ankle. Ultrasounds of the right knee and left ankle taken after the thermal imaging are shown in FIGS. 3B and 3C, respectively.

FIG. 3B is an ultrasound image of the right knee of the patient in FIG. 3A, in accordance with the present technology. As shown in FIG. 3B, there is an effusion located between the patella and femur of the patient's right knee. This effusion may be an indicator that the patient has arthritis (or JIA). FIG. 3C is an ultrasound image of the left ankle of the patient in FIG. 3A, in accordance with the present technology. Just as in FIG. 3B, in FIG. 3C, an effusion is shown between a patient's tibia and talus in their left ankle. In such a manner, the presence of effusions representative of arthritis and/or JIA may be detected with the methods and systems disclosed herein.

Figure 4A:
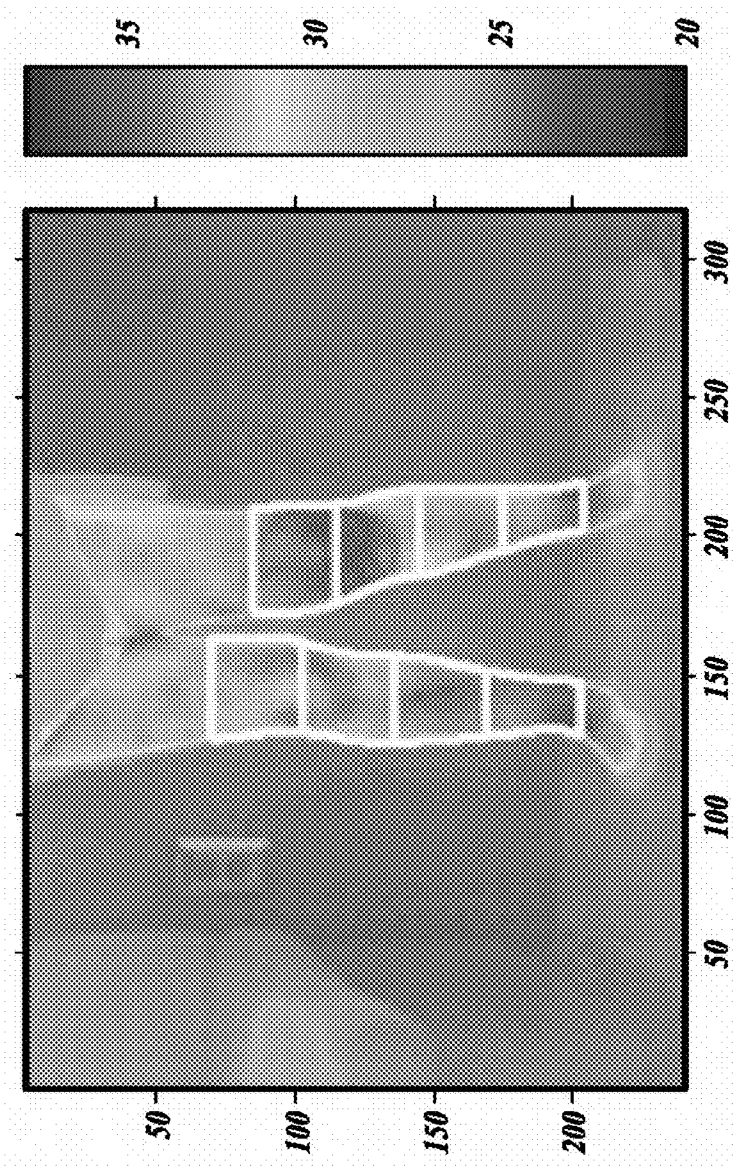
FIG. 4A is a representative thermal image of a patient with arthritis, in accordance with the present technology.

FIG. 4A is a representative thermal image of a patient with arthritis, in accordance with the present technology. In some embodiments, the thermal image shown in FIG. 2 is taken with a Fluke camera or a FLIR camera. In some embodiments, the thermal image of FIG. 2 may be the second image as described herein. On the horizontal axis and the left-hand vertical axis is representational distance. On the right-hand vertical axis is temperature in ° C. As shown in FIG. 4A, there is an elevated temperature in the patient's left knee, but not the patient's right knee. Such elevated temperature may indicate the presence of an effusion and/or arthritis in the left knee, while the temperature associated with a healthy individual may indicate the absence of an effusion and/or arthritis in the right knee, as shown in FIGS. 4B-4C.

Figure 4B:
FIG. 4B is an ultrasound image of the right knee of the patient in FIG. 4A, in accordance with the present technology.

FIG. 4B is an ultrasound image of the right knee of the patient in FIG. 4A, in accordance with the present technology. As explained above, the right knee does not include an effusion, and thus there is likely not arthritis and/or JIA in the patient's right knee.

Figure 4C:
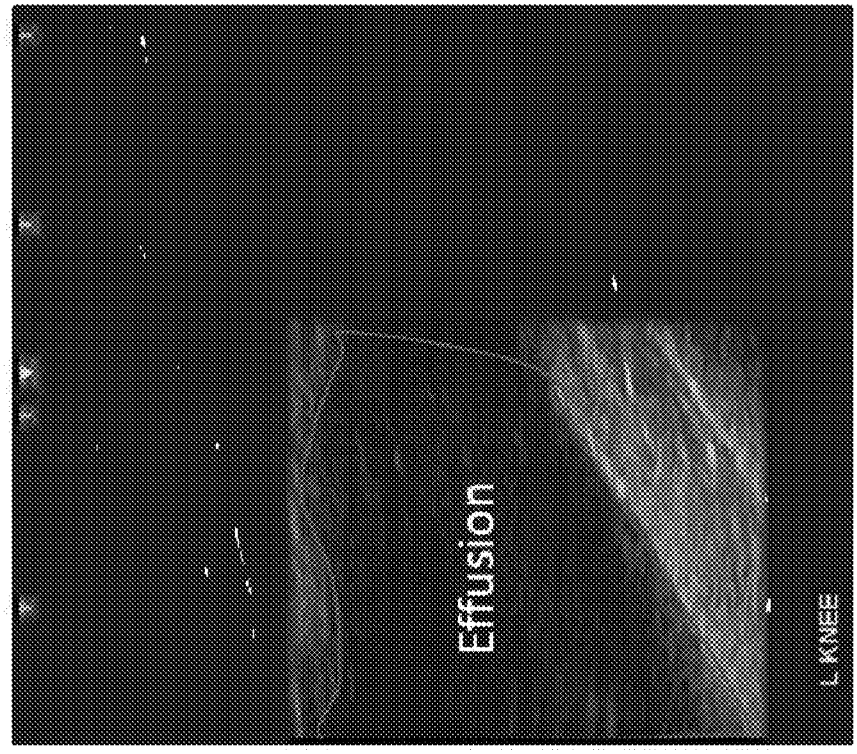
FIG. 4C is an ultrasound image of the left knee of the patient in FIG. 4A, in accordance with the present technology.

FIG. 4C is an ultrasound image of the left knee of the patient in FIG. 4A, in accordance with the present technology. The elevated temperature shown in FIG. 4A corresponds to an effusion located in the left knee of the patient. This effusion may be indicative of arthritis and/or JIA in the right knee.

Figure 5A:
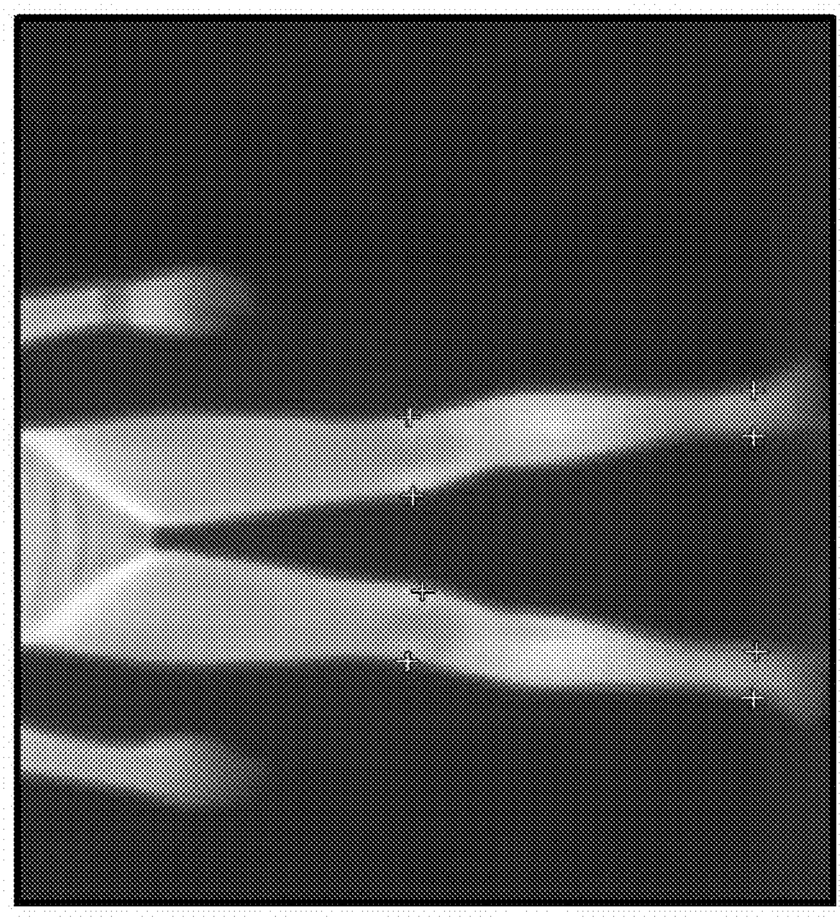
FIGS. 5A-5C show an example method of identifying a joint of a patient, in accordance with the present technology.
Figure 5B:
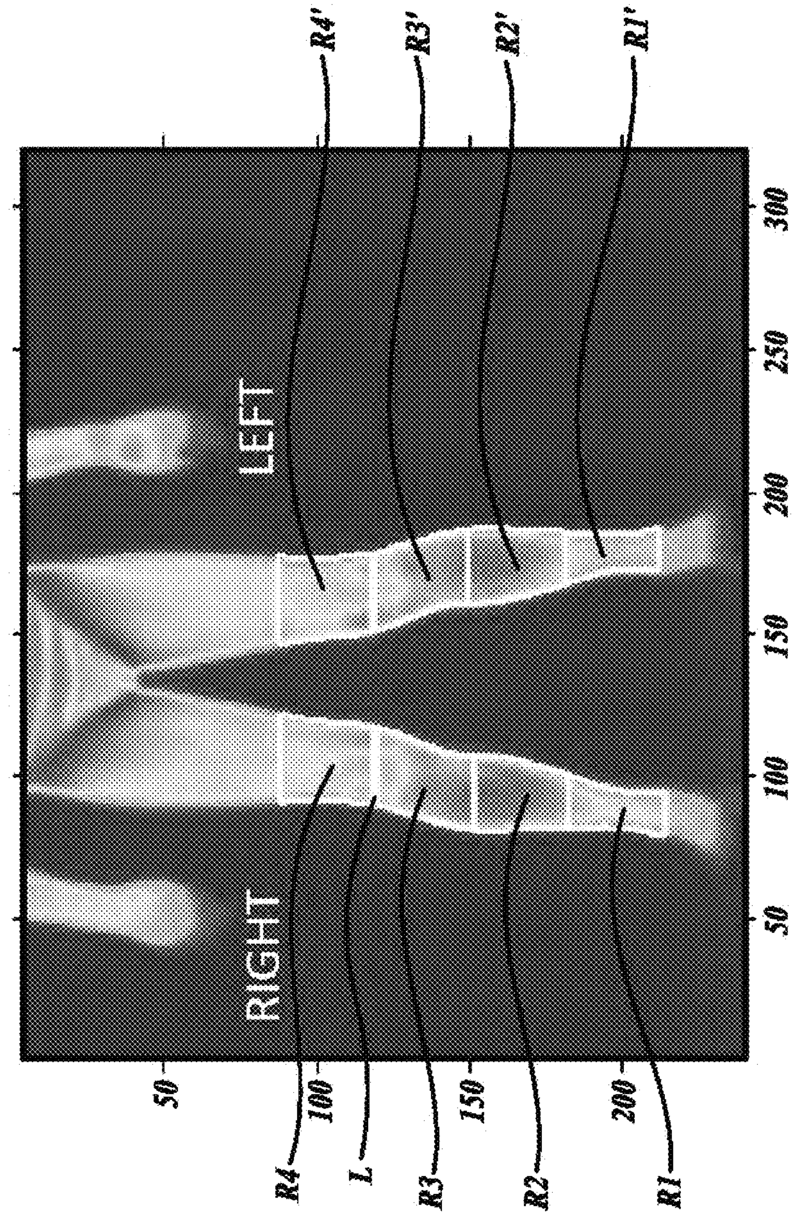
Figure 5C:
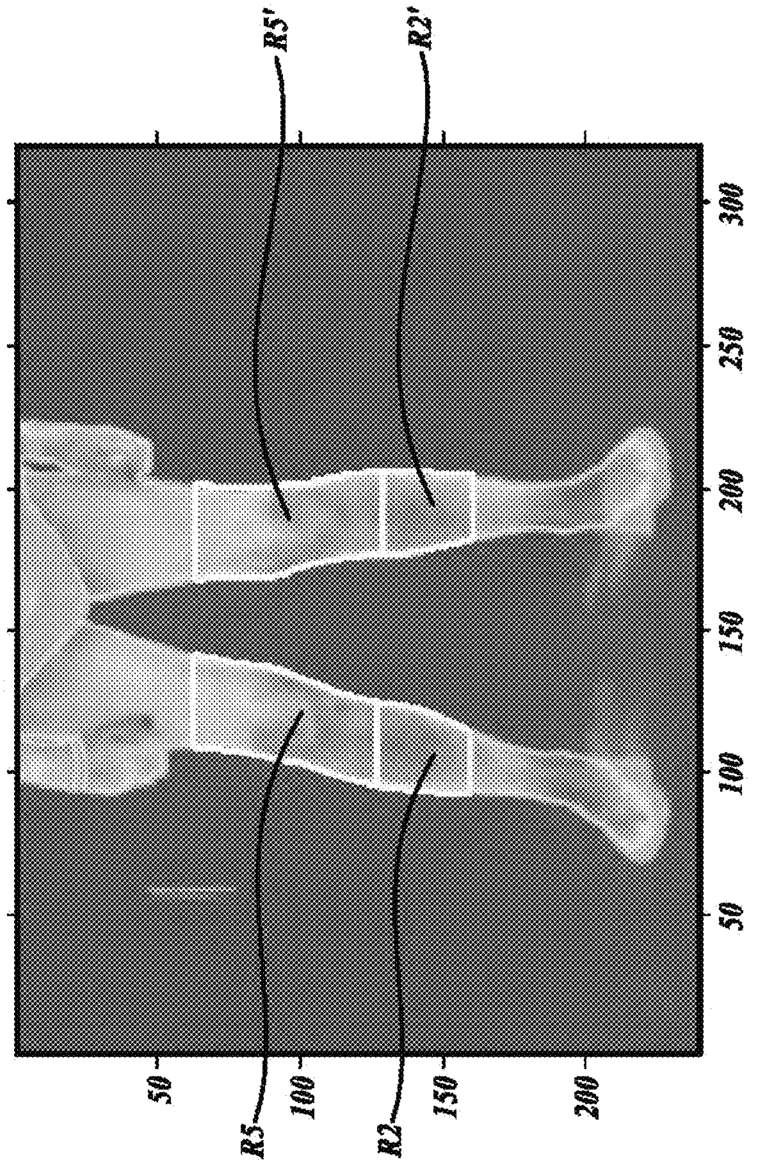

FIGS. 5A-5C show an example method of identifying a joint of a patient, in accordance with the present technology. In some embodiments, the method is further used to determine a presence of arthritis in a patient. In some embodiments, a thermal image (or thermal light image) of the patient's joint is taken, as shown in FIGS. 1A-1B. In some embodiments, the thermal image is obtained with a thermal camera, for example, a FLIR or a Fluke camera as disclosed herein. In some embodiments, the thermal image is taken with a smartphone. In some embodiments, an outline of the patient's joint is determined. In some embodiments, a first joint of the patient is identified, such as a knee. In some embodiments, a second joint of the patient is identified, such as an ankle. In some embodiments, more than one joint may be identified either consecutively or simultaneously. As shown in FIG. 5A, the right knee, left knee, right ankle, and left ankle of the patient are identified.

In some embodiments, an area between the first joint and the second joint is divided into a plurality of parts, wherein each part of the plurality of parts are equal in size, as shown in FIG. 5B. In some embodiments, the plurality of parts (or ROIs) include a first part R3, a second part R2, and a third part R1. In some embodiments, the first part R3 is reflected across a line L at the first reference point (or first joint identified—the knee) to form a reflected first part (or fourth part) R4.

In some embodiments, as shown in FIG. 5C, the first part R3 and the reflected first part into a contiguous area R5 (also referred to herein as a fifth part or a fifth ROI). In some embodiments, this method may be repeated or performed simultaneously on two or more limbs of the patient, as shown in FIGS. 5A-5C. In some embodiments, the method further includes assigning the contiguous area R5 as the patient's joint, while an outline of the contiguous area R5 may be identified as the outline of the patient's joint.

In some embodiments, the outline of the patient's joint may include one or more ROI R1, R2, R3, R4 of a first limb of the patient, and one or more ROI R1', R2', R3', R4' of a second limb of the patient. In some embodiments, the method further includes determining a first representative topological temperature within the outline of the patient's joint. A second representative topological temperature may then be determined within the outline of the reference area. By comparing the first representative topological temperature and the second representative topological temperature a likelihood of the presence of arthritis within the patient's joint may be determined.

EXAMPLES

Example 1: Within-Leg Calibration for Enhanced Accuracy of Detection of Arthritis by Infrared Thermal Imaging Children with clinically active arthritis in the knee or ankle, as well as healthy controls, were enrolled in a development cohort and another group of children with knee symptoms were enrolled in a validation cohort. Ultrasound was performed for the arthritis subgroup for the development cohort. Joint exam by certified rheumatologists was used as a reference for the validation cohort. Infrared thermal data were analyzed using custom software. Temperature after within-limb calibration (TAWiC) was defined as the temperature differences between joint and ipsilateral mid-tibia. TAWiC of knees and ankles was evaluated using ANOVA across subgroups. Optimal thresholds were determined by receiver operating characteristic (ROC) analysis using Youden index.

Institutional review board (IRB) approval (#15350, #1383) was obtained from the authors' tertiary-care, multidisciplinary pediatric hospital prior to the study. For the development cohort, two groups, including children with clinically confirmed arthritis in the knee or ankle, and healthy children between ages of 2 and 18 years, were consented and enrolled. Inclusion criteria of the arthritis group were active arthritis in knee and/or ankle diagnosed by treating physician (swelling, or pain with and limitations in motion if there was no swelling). Inclusion criteria of the healthy control group were normal skeletal health. Exclusion criteria for both groups were: 1) skin infection in imaged area that could interfere with thermal imaging results, 2) fever, 3) joint contracture greater than 10 degrees, and 4) inability to cooperate with the acquisition of thermal imaging, and 5) recent injury to the areas of interest. For the validation cohort, children with knee pain and/or swelling for at least a week, who seek care from rheumatology for the first time, were enrolled. The same exclusion criteria were applied as for the development cohort.

As previously described, all subjects received infrared thermal imaging analysis of the lower limbs from four views (anterior, posterior, medial and lateral). Thermal imaging was performed using a Fluke™ TiR32 Thermal Imager (Fluke Inc., Everett, WA) with 76,800 pixels (320×240) (detection range −20 to 150° C., sensitivity ≤0.04° C.) by trained staff to ensure sharp focus and consistent camera leveling and stabilization. The entire imaging session for each patient took less than 5 minutes. Subjects exposed their feet and entire legs to room air and rested for at least 10 minutes prior to imaging to allow stabilization and equilibration of skin temperature. The ambient temperature was set at 22.2° C. for all patients. Subjects posed in standardized positions to ensure consistency of image acquisition. Imaging was performed with subjects standing on a carpet to avoid influence from the cold floor on body temperature, and away from potentially interfering items such as metal panels, doorknobs, computer screens, and adjacent people. The camera was positioned at the knee level of the subjects. The distance between camera and subject ranged between 4 to 5 m in order to maximize the spatial resolution of imaged body parts.

Only subjects from the JIA group within the development cohort were scanned with ultrasound. Standard B-mode views of the knees (longitudinal and transverse suprapatellar, transverse posterior) with 20-30 degrees of flexion, tibiotalar joints (anterior longitudinal and transverse, medial and lateral para malleolus) with plantar flexion, and subtalar joints (lateral longitudinal) in a neutral position, without compression were collected after thermal imaging in the arthritis group by one pediatric rheumatologist (YZ) with USSONAR (Ultrasound School of North American Rheumatologists) certification and 5 years of experience using the GE LOGIQ e ultrasound machine (General Electronics Inc., Boston, MA). Matching joint examinations were performed on the same day before ultrasound images were obtained.

Subjects within the validation cohort were not scanned by ultrasound because the goal of applying this thermal imaging tool is to identify patients from community to accelerate the referral process and a joint exam performed by certified rheumatologist remains the well-accepted standard clinical practice.

The spatial and temperature data from infrared thermal images were exported from Smartview® software (Fluke Inc., Everett, WA). Data were then analyzed using customized semi-automated software developed in Matlab® (Mathworks, Natick, MA). In brief, lower legs were divided equally into three segments (proximal, mid, and distal) longitudinally by placing crosshairs at the medial and lateral sides of the knees and ankles from each view, and distal femur was defined as the same length as the proximal tibia/fibula segment. Then the proximal tibia/fibula and distal femur segments were merged as the ROI for knee. Using the distal tibia/fibula length as a reference, one-third of the reference above ankle line and one-ninth of the reference below the ankle line were merged as "ankle" for thermal imaging analysis that include tibiotalar and subtalar joints. Mean and $95^{th}$ percentiles temperatures were recorded for each leg or joint segment. A previous study showed high reproducibility for this technique (ICC 0.936-0.981) (13).

Temperature After Within-limb Calibration (TAWiC) was calculated as the summary measure (mean or $95^{th}$ percentile) for the joint (knee or ankle) minus the summary measure for mid-tibia. Thus, TAWiC measures how much hotter the joint is than the mid-tibia of the same limb.

A small set of ultrasound images from previous patients were reviewed by two radiologists (RSI and MT) and a rheumatologist (YZ) for calibration purposes. Ultrasound images were scored as a consensus between two pediatric musculoskeletal radiologists (RSI, MT). When bone and tendon landmarks were not well visualized, images were excluded. A joint effusion was defined as anechoic material within the joint space or within the suprapatellar bursa (knee), or that displaced a fat pad in the tibiotalar and subtalar joints. Grading of joint effusion was performed. Synovial thickening was defined as hypoechoic material within the joint space that was not compressible. Tenosynovitis was defined as anechoic or hypoechoic material within the tendon sheath that circumscribed the tendon. Presence or absence of these parameters was recorded. Arthritis was defined as the presence of synovial thickening, or at least a moderate effusion without synovial thickening. Since it was difficult to distinguish tibiotalar and subtalar joints on thermal imaging, these are combined: the "ankle" was considered to be inflamed if either tibiotalar or subtalar joint (or both) was inflamed, or isolated tenosynovitis was present.

Demographic information including gender, age, ethnicity, and race, and clinical data including body height, weight, oral or temporal temperatures was collected in all subjects. Within the JIA group in the development cohort and new patients in the validation cohort, the presence or absence of joint swelling, pain or warmth, physician global assessment (0-10), childhood health assessment questionnaire (CHAQ) score (0-3), patient/parent assessment of arthritis activity (0-10), patient/parent assessment of overall health (0-10), and current medications were recorded. Laboratory data including were also collected if available.

Histograms were examined for outliers and non-normality. Demographic variables were summarized and compared between children with JIA and healthy subjects using Chi-square tests for categorical measures and t-tests or Mann-Whitney U tests for numerical measures, depending on whether the measure is approximately normally distributed. Generalized estimating equations analysis was used to compare inflamed to uninflamed joints while accounting for the fact that the two joints within a child were not independent observations and using the sandwich estimator of standard error which is robust to non-normality. Absolute temperatures and TAWiC were dependent variables and whether or not the joint was inflamed was the predictor of interest. Analyses were done separately for each view. Receiver operating characteristic (ROC) curve analyses were used to describe how well the different summary measures can predict whether a joint is inflamed. Optimal thresholds were determined by ROC analysis using Youden index then applied to the validation cohort. Sensitivity and specificity of detecting knee arthritis in validation cohort was determined using derived thresholds. Pearson correlation is used to describe the association between TAWiC 95 and demographic measures gender, age, height, weight and BMI. A P value below 0.05 was considered statistically significant. All analyses were done using IBM SPSS Version 19 (IBM Corp. Released 2010. IBM SPSS Statistics for Windows, Version 19.0. Armonk, NY: IBM Corp.)

A conservative power analysis showed that a sample size of 25 subjects per group would give over 90% power for detecting group differences as long as the true standardized effect size (difference in means divided by within-group SD) was at least 1.0. This effect size corresponds approximately to sensitivity of 70% and specificity of 70%. Since a measure with sensitivity and specificity smaller than this would not be useful clinically, this study has adequate power for detecting any clinically useful difference Fifty-three children from the JIA group, forty-nine from the healthy group from the development cohort, and forty-three children with knee symptoms from the validation cohort were enrolled. Fifty-one children within the JIA group completed ultrasound examinations and had evaluable thermal imaging and were included in the analysis. Forty-eight children from the healthy group had evaluable thermal imaging and included in the analysis. Patient characteristics from each group were summarized and compared in Table 1.

TABLE 1

Patient Characteristics

| Variables | Asymptomatic Exercise Cohort N = 26 | Symptomatic cohort N = 43 |
|---|---|---|
| | Mean ± SD or number (%) | |
| Age at enrollment (years) | 11.5(3.4) | 11.2(4.1) |
| Female | 18(69.2) | 27(62.8%) |
| Weight (kg) | 49.7(23.0) | 43.8(18.9) |
| Height (cm) | 146.4(18.7) | 144.2(22.1) |
| BMI | 22.0(5.6) | 19.9(4.2) |
| Oral temperature ( ° C.) | 37.0(0.3) | 37.0(0.2) |

There was no statistically significant difference in demographic characteristics between JIA and control groups. Within the JIA group, the mean duration of disease was three years, and a majority of subjects were not on systemic medications. The majority of JIA patients (65%) in development cohort were categorized as oligoarticular.

Active arthritis on joint exam was defined as pain of motion (POM) plus limitation of motion (LOM), or swelling, for knee and ankle, and tenderness and POM, or tenderness and LOM for subtalar joint. Active arthritis on ultrasound was based on the presence of synovial thickening with or without effusion, or at least a moderate effusion if without synovial thickening for all three joints. Tenosynovitis around ankle and subtalar joints was classified as "inflammation of ankle" on ultrasound. Within the JIA group, 49 (48%) knee, 24 (22%) tibiotalar, and 15 (15%) subtalar joints had active arthritis on physical examination. Meanwhile, 45 (44%) knee, 15 (14%) tibiotalar, 11 (11%) subtalar joints had active arthritis and 8 (8%) ankle joints had active tenosynovitis on ultrasound. The final count of inflammatory knees was 45, and number of inflammatory ankles was 19. A total of 11 joints (knees or ankles) from development cohort were excluded from the analysis due to physical exam findings of arthritis but a normal ultrasound. Among 43 children with knee complaints within the validation cohort, seven patients had arthritis in a total of 10 knees whereas only three patients had arthritis in five ankles (tibiotalar and/or subtalar joint) determined by physical exam alone.

Within the development cohort, all joint segments (knee and ankle) were divided into three groups: the healthy control group, joints in the JIA group with inflammation, and joints in the JIA group without inflammation. Joints that were classified as arthritis by joint exam but not confirmed by ultrasound were excluded. Preliminary analyses showed little difference between uninflamed joints in children with JIA and in healthy control children, so these two groups were combined into one group for all analyses, referred to as the uninflamed joint group. An example of a healthy child, as described above, is shown in FIG. 2.

FIG. 2 shows a representative patient with thermal image, absolute temperatures and TAWiC of knees, ankles and mid-tibia as well as corresponding ultrasound findings confirming active arthritis in a knee and a tibiotalar joint. Table 2 shows the means and standard deviation (SD) of the absolute and calibrated temperature summaries by inflammation status of joints from development cohort.

TABLE 2

TAWiC and absolute temperatures from knee and ankle ROI from Symptomatic Knee Pain Cohort. Mean ± SD

| | Analyses of Knees and Corresponding Mid Tibia | | | | |
|---|---|---|---|---|---|
| | Resting 1 N = 52 | Physical Activity N = 52 | Resting 2 N = 52 | p-value* Resting 1 vs. Physical Activity | p-value* Resting 1 vs. Resting 2 |
| Knee | | | | | |
| $95^{th}$ absolute (Anterior) | 33.38 (1.06) | 32.45 (1.47) | 33.09 (1.29) | <.0001 | 0.035 |
| $95^{th}$ absolute (Lateral) | 32.98 (1.16) | 32.83 (1.47) | 33.38 (1.12) | 0.1955 | <.0001 |
| $95^{th}$ absolute (Medial) | 33.21 (1.01) | 32.38 (1.41) | 33.31 (1.17) | <.0001 | 0.4551 |
| $95^{th}$ absolute (Posterior) | 33.67 (0.85) | 33.27 (1.49) | 33.96 (1.17) | 0.0019 | 0.0008 |
| $95^{th}$ TAWiC (Anterior) | −0.12 (0.54) | −0.72 (0.47) | −0.2 (0.56) | <.0001 | 0.1288 |
| $95^{th}$ TAWiC (Lateral) | 0.13 (0.51) | −0.53 (0.52) | 0.05 (0.54) | <.0001 | 0.0674 |
| $95^{th}$ TAWiC (Medial) | 0.57 (0.67) | −0.33 (0.57) | 0.26 (0.56) | <.0001 | 0.0005 |
| $95^{th}$ TAWiC (Posterior) | 1.75 (0.62) | 1.03 (0.7) | 1.36 (0.63) | <.0001 | <.0001 |

TABLE 2-continued

TAWiC and absolute temperatures from knee and ankle ROI from Symptomatic Knee Pain Cohort. Mean ± SD

| | Analyses of Knees and Corresponding Mid Tibia | | | | |
|---|---|---|---|---|---|
| | Resting 1 N = 52 | Physical Activity N = 52 | Resting 2 N = 52 | p-value* Resting 1 vs. Physical Activity | p-value* Resting 1 vs. Resting 2 |
| Mean Absolute (Anterior) | 32.03 (1.02) | 30.71 (1.29) | 31.73 (1.25) | <.0001 | 0.0145 |
| Mean Absolute (Lateral) | 31.73 (1.13) | 31.29 (1.38) | 32.09 (1.11) | <.0001 | 0.0001 |
| Mean Absolute (Medial) | 31.83 (1.07) | 30.99 (1.35) | 31.96 (1.17) | <.0001 | 0.2355 |
| Mean Absolute (Posterior) | 32.11 (0.95) | 31.58 (1.43) | 32.36 (1.04) | <.0001 | 0.0081 |
| Mean TAWiC (Anterior) | −0.24 (0.53) | −0.82 (0.54) | −0.26 (0.53) | <.0001 | 0.6973 |
| Mean TAWiC (Lateral) | −0.08 (0.56) | −0.76 (0.55) | −0.16 (0.59) | <.0001 | 0.0221 |
| Mean TAWiC (Medial) | 0.16 (0.49) | −0.49 (0.48) | −0.07 (0.54) | <.0001 | <.0001 |
| Mean TAWiC (Posterior) | 1.12 (0.47) | 0.56 (0.49) | 0.86 (0.57) | <.0001 | <.0001 |
| Mid Tibia | | | | | |
| $95^{th}$ absolute (Anterior) | 33.49 (1.08) | 33.16 (1.42) | 33.29 (1.1) | 0.0167 | 0.089 |
| Mean Absolute (Anterior) | 32.28 (1.04) | 31.52 (1.36) | 31.99 (1.11) | <.0001 | 0.0162 |

The size of ROI showed trends of increase in inflamed limb but no statistically significant difference.

In general, absolute and TAWiC temperatures were higher in inflamed knees and ankles than in uninflamed counterparts. Compared to absolute values, TAWiC showed a greater temperature difference between groups, with smaller SD within each group and more significant p-values. The posterior view showed considerably a smaller difference between groups than did the other views. Both TAWiC $95^{th}$ percentile and mean temperatures of the inflamed knees from the anterior, lateral and medial views differed from the uninflamed knees by about 1° C. However, TAWiC $95^{th}$ percentile temperatures of the inflamed ankles differed from the uninflamed ankles more than TAWiC mean temperature did (0.88 vs. 0.42° C.). The temperatures of mid-tibia (a reference ROI for computing TAWiC) were slightly cooler in limbs corresponding to an inflamed joint, though this difference was not statistically significant.

ROC analyses using TAWiCKnee showed that the area under the curve (AUC) was similar among anterior, medial, and lateral views, but much lower in posterior views (Table 3).

TABLE 3

Sensitivity and specificity of detection of knee arthritis by using TAWiC from two cameras Variables Mean ± SD

| | Analyses of Knees and Corresponding Mid Tibia | | | |
|---|---|---|---|---|
| | Fluke Camera N = 86 | FLIR Camera N = 86 | Mean Difference in Fluke-FLIR N = 86 | P = value* |
| Knee | | | | |
| $95^{th}$ absolute (Anterior) | 33.76 (1.1) | 31.54 (2.33) | 2.22 (1.73 to 2.72) | <0.0001 |

TABLE 3-continued

Sensitivity and specificity of detection of knee arthritis by using TAWiC from two cameras Variables Mean ± SD

| | Analyses of Knees and Corresponding Mid Tibia | | | |
|---|---|---|---|---|
| | Fluke Camera N = 86 | FLIR Camera N = 86 | Mean Difference in Fluke-FLIR N = 86 | P = value* |
| $95^{th}$ absolute (Lateral) | 33.35 (0.97) | 32.80 (1.29) | 0.54 (0.28 to 0.81) | <0.0001 |
| $95^{th}$ absolute (Medial) | 33.44 (1.00) | 32.93 (1.29) | 0.52 (0.25 to 0.78) | 0.0001 |
| $95^{th}$ absolute (Posterior) | 33.87 (0.89) | 33.63 (0.95) | 0.24 (0.05 to 0.44) | 0.0137 |
| $95^{th}$ TAWiC (Anterior) | −0.02 (0.82) | 0.06 (0.82) | −0.08 (−0.12 to −0.04) | 0.0004 |
| $95^{th}$ TAWiC (Lateral) | 0.24 (0.65) | 0.29 (0.69) | −0.04 (−0.09 to 0.00) | 0.0773 |
| $95^{th}$ TAWiC (Medial) | 0.58 (0.70) | 0.54 (0.71) | 0.04 (−0.02 to 0.10) | 0.2020 |
| $95^{th}$ TAWiC (Posterior) | 1.53 (0.42) | 1.40 (0.40) | 0.13 (0.08 to 0.18) | <0.0001 |
| Mean Absolute (Anterior) | 32.36 (1.08) | 30.24 (2.32) | 2.12 (1.63 to 2.60) | <0.0001 |
| Mean Absolute (Lateral) | 32.05 (0.86) | 31.56 (1.19) | 0.49 (0.22 to 0.75) | 0.0002 |
| Mean Absolute (Medial) | 32.16 (0.91) | 31.65 (1.27) | 0.51 (0.25 to 0.77) | 0.0001 |
| Mean Absolute (Posterior) | 32.44 (0.85) | 32.31 (0.93) | 0.13 (−0.05 to 0.02) | 0.1620 |
| Mean TAWiC (Anterior) | −0.25 (0.65) | −0.25 (0.69) | 0.00 (−0.04 to 0.03) | 0.8696 |
| Mean TAWiC (Lateral) | −0.05 (0.50) | −0.03 (0.53) | −0.02 (−0.05 to 0.02) | 0.3137 |
| Mean TAWiC (Medial) | 0.15 (0.46) | 0.20 (0.50) | −0.05 (−0.09 to −0.01) | 0.0193 |

TABLE 3-continued

Sensitivity and specificity of detection of knee arthritis by using TAWiC from two cameras

| Variables Mean ± SD | Analyses of Knees and Corresponding Mid Tibia | | | |
|---|---|---|---|---|
| | Fluke Camera N = 86 | FLIR Camera N = 86 | Mean Difference in Fluke-FLIR N = 86 | P = value* |
| Mean TAWiC (Posterior) | 1.03 (0.35) | 1.11 (0.34) | −0.07 (−0.11 to −0.04) | <0.01 |
| Mid Tibia | | | | |
| $95^{th}$ absolute (Anterior) | 33.78 (1.11) | 31.48 (2.23) | 2.30 (1.81 to 2.79) | <0.0001 |
| Mean Absolute (Anterior) | 32.61 (1.07) | 30.49 (2.12) | 2.12 (1.64 to 2.59) | <0.0001 |

AUC was increased by 0.2 (30%) when TAWiCKnee was used compared to that of absolute temperature (ranging from 0.544-0.659). The thresholds of TAWiCKnee which maximizes The Youden index were similar for anterior, medial, and lateral views (Table 3). The sensitivity of detecting arthritis in the knee varied from 0.64 to 0.78 and the specificity ranged between 0.79 and 0.92 excluding posterior view. The sensitivity of detecting inflammation in ankle region from anterior view was 0.80 and the specificity was 0.60. Other views of ankle, using the ROI definition described herein, repeatedly spilled outside of limb contours and therefore was not evaluable. These results were similar to that from analyses completed with joint exam as the gold standard or ultrasound alone as the gold standard.

Within the inflamed knee group, females had higher TAWiCKnee than males, and younger children and shorter children had higher TAWiCKnee than their older and taller counterparts, respectively. Within the inflamed ankle group, there was no correlation of TAWiCAnkle with gender, age, height, weight or BMI. However, within the healthy group, males, younger children and those with higher BMI had higher TAWiCAnkle whereas younger and shorter children without inflamed ankles in JIA group had higher TAWiCAnkle.

Within the validation cohort, a knee joint was considered inflamed when both mean and $95^{th}$ TAWiCKnee of each knee were greater than the corresponding thresholds from each view in the development cohort. Compared to the results of physical exam as the gold standard, the sensitivity of accurate detection of arthritis from individual views ranged from 0.60 to 0.70 and the specificity was greater than 0.9 in all views. When all mean and $95^{th}$ TAWiC readings from every view must be greater than the corresponding thresholds of corresponding views, the sensitivity and specificity were similar to using individual views.

Although the study was not designed to validate the detection of ankle inflammation, the sensitivity of using TAWiCankle for detection was 0.80 and the specificity was 0.68.

This is the first study to propose a novel algorithm to reliably detect active arthritis in children using Infrared Thermal Imaging. The approach to analyzing the thermal images from children with JIA and healthy children is reproducible and semi-automated, making it potentially useful in a wide range of situations to detect active arthritis. The addition of the within-leg internal control in this investigation improved the capacity of distinguishing between inflamed and uninflamed joint area over an absolute temperature measure of the area of interest. This was a proof-of-concept study that focused on lower extremities due to the high prevalence of arthritis in knees and ankles. Further refinement of this approach may be applied to disease monitoring of chronic arthritis in both adults and children.

Significantly increased temperatures in both inflamed knee and ankle joints not only by absolute temperature were identified, and variation was significantly reduced by applying within-limb calibration. Therefore, the algorithm improved the distinguishing ability of arthritis by thermal imaging. In addition, the definition of the knee joint and ankle were based on anatomy and this principle can be applied to other joints such as elbow, wrist and digit joints. Another advantage of applying an internal control is to allow identification of joint inflammation in both legs of an affected individual.

Among all views, anterior, medial and lateral views provided similar sensitivity to distinguish knees with inflammation from those without inflammation, which is consistent with previous studies. For the ankle joint, due to greater anatomical complexity, articular or tendon sheath inflammation may cause temperature changes that are only detectable on certain views. In this analysis, only the anterior view showed a significant difference in TAWiCAnkle between inflamed and uninflamed ankles. Optimization of ROI for ankle joints from medial, lateral and posterior views might allow us to determine the specificity of view-specific changes of temperatures that correspond to inflammation from specific anatomical structures. For example, isolated inflammation within lateral tendons may reveal elevated TAWiCAnkle only from a lateral view and not from other views. Definition of ankle ROI and patterns of heat distribution from other views may be defined and evaluated through a machine learning approach in the future.

The significant impact of age, gender and height on $95^{th}$ TAWiCKnee and TAWiCAnkle in subgroups suggests that the method needs to be validated in various age groups, and that thresholds may be different depending on age and gender. It is also possible that the increase of TAWiC is dependent on the severity of joint swelling such that more subtle swelling is less detectable by thermal imaging. Using the current dataset from development cohort, we identified thresholds of TAWiC for equally improved sensitivity and specificity. For practical use, one may select a higher threshold for greater specificity when the pre-test probability is low, such as screening of healthy children. In contrast, a lower threshold may be chosen for higher sensitivity when the pre-test probability is high, such as a child with history of JIA who has knee pain.

The new algorithm and preliminary thresholds of TAWiCknee were validated in a separate cohort that demonstrated reasonable sensitivity and high specificity. With modification of the threshold of mean TAWiC knee, sensitivity can be increased from 0.70 to 0.90 without sacrificing specificity. These results showed promise of potentially applying thermal imaging in screening and monitoring knee arthritis in children especially during the era of increasing telehealth when joint exam is not performed in person. However, in-person visit and established imaging such as MRI and ultrasound are still needed when persistent symptoms are concerning despite normal thermal imaging results.

There were significant differences in mean and $95^{th}$ TAWiC of knee in anterior, medial, lateral views, and of ankles in anterior view, between inflamed and uninflamed counterparts ($p<0.05$). The area under the curve (AUC) was higher by 36% when using TAWiCKnee than those when using absolute temperature. Within validation cohort, the sensitivity of accurate detection of arthritis in knee using both mean and 95$^{th}$ TAWiC from individual views or combined all 3 views ranged from 0.60 to 0.70 and the specificity was greater than 0.90 in all views.

Children with active arthritis or tenosynovitis in knees or ankles exhibited higher TAWiC than healthy joints. The validation cohort study showed promise of the clinical utility of infrared thermal imaging for arthritis detection.

Capacity of determining inflammation of knees and ankles by thermal imaging were increased when using internal calibration. Furthermore, the thresholds determined can effectively screen for arthritis with a reasonable sensitivity and high specificity. These findings, if validated in a large population with optimization, may be highly applicable to patient care, especially during telehealth.

The use of a novel algorithm of infrared thermal imaging in children with active arthritis, or tenosynovitis, in knees or ankles revealed higher TAWiC than healthy unaffected joints. The validation cohort study showed promise of the clinical utility of infrared thermal imaging for arthritis detection.

Example 2: Validating within-Limb Calibrated Algorithm Using a Smartphone Attached Infrared Thermal Camera for Detection of Arthritis The objective of this study was to determine the impact of physical activity on temperature after within-limb calibration (TAWiC) measures and their reproducibility, and to determine if a smartphone attached thermal camera is comparable to thermal imaging using a handheld thermal camera for detection of arthritis in children.

Children without symptoms were enrolled to the "asymptomatic exercise cohort", and received infrared imaging, using a standard handheld camera, after initial resting period, after activity, and after second resting period. Children seen in the rheumatology clinic with knee pain were enrolled into the "symptomatic knee pain cohort" and received imaging with both the smartphone-attached and handheld cameras before a routine clinical exam. Temperature after within-limb calibration (TAWiC) was defined as the temperature differences between joint and ipsilateral mid-tibia as the main readout for arthritis detection.

The asymptomatic exercise cohort demonstrated notable changes in absolute and TAWiC temperatures collected by thermal imaging after physical activity, and temperatures did not consistently return to pre-activity levels after a second period of rest. In the 95$^{th}$ TAWiC anterior view, resting one −0.12C (0.54), activity −0.72C (0.47), resting two −0.2C (0.56), resting 1 vs resting 2 p-value=0.13. In the symptomatic knee pain cohort, the smartphone and handheld thermal cameras performed similarly in regards to detection of joint inflammation and evaluation of joint temperature using the TAWiC algorithm, with high sensitivity of 80% (55.2 100.0%) and specificity of 84.2% (76.0-92.4%) in the anterior knee view when compared with the gold standard joint exam by a pediatric rheumatologist. The mean relative 95$^{th}$ TAWiC temperature difference between the two cameras was −0.08C (−0.12 to −0.04)(p=0.0004).

Institutional review board (IRB) approval (#15350, #1383) was obtained from The Seattle Children's Hospital Research Foundation IRB prior to the study. Written informed consent was obtained from all study participants for study participation and publication. Patients were divided into two cohorts. For the asymptomatic exercise cohort, two groups, including children without any symptoms but a preexisting diagnosis of juvenile arthritis, and healthy children between the ages of 2 and 18 years, were consented and enrolled. Inclusion criteria of the arthritis group were existing diagnosis of JIA without active joint inflammation at time of study visit. Inclusion criteria of the healthy control group were normal skeletal health. Exclusion criteria for both groups were: 1) skin infection in imaged area that could interfere with thermal imaging results, 2) fever, 3) joint contracture greater than 10 degrees, and 4) inability to cooperate with the acquisition of thermal imaging, and 5) recent injury to the areas of interest. For the symptomatic knee pain cohort, children with knee pain and/or swelling for at least a week, who sought care from rheumatology for the first time, were enrolled. The same exclusion criteria were applied as for the asymptomatic exercise cohort.

As previously described, infrared thermal imaging of the lower limbs from four views (anterior, posterior, medial and lateral) was performed using two infrared Fluke™ and FLIR™ cameras by trained staff to ensure sharp focus and consistent camera leveling and stabilization. Fluke™ TiR32 Thermal Imager (Fluke Inc., Everett, WA) with 76,800 pixels (320×240) (detection range −20 to 150° C., sensitivity ≤0.04° C.). FLIR™ ONE PRO (Teledyne FLIR LLC, Wilsonville, OR) with 19,200 pixels (160×120) (detection range −20 to 400° C., sensitivity ≤0.07° C. (70 mK)). All subjects exposed their feet and entire legs to room air and rested for at least 10 minutes prior to imaging to allow stabilization and equilibration of skin temperature. Images were taken with both the handheld (Fluke) and smartphone based (FLIR ONE PRO) camera sequentially within a two-minute time span for the symptomatic knee pain cohort. Subjects in the asymptomatic exercise cohort were imaged with the Fluke camera at 3 defined time points: 1) at baseline resting for at least 10 minutes, 2) immediately after walking in designated hallway for 10 minutes, and 3) after 10 minutes of resting upon completion of walking. Ambient temperature was set at 22.2° C. for all patients. Subjects posed in standardized positions to ensure consistency of image acquisition. Imaging was performed with subjects standing on a carpet to avoid influence from the cold floor on body temperature, and away from potentially interfering items such as metal panels, doorknobs, computer screens, and adjacent people. The camera is positioned at the knee level of the subjects. The distance between camera and subject ranged between 4 to 5 m in order to maximize the spatial resolution of the imaged body parts. The Fluke camera was used in the asymptomatic exercise cohort as this camera has been previously validated by the group for use of detection of arthritis (14).

The spatial and temperature data from infrared thermal images were exported from corresponding Smartview® software (Fluke Inc., Everett, WA) or FLIR Tool (Teledyne FLIR LLC, Wilsonville, OR). Data were then analyzed using customized semi-automated software were divided equally into three segments (proximal, mid, and distal) longitudinally by placing crosshairs at the medial and lateral sides of the knees and ankles from each view, and distal femur was defined as the same length as the proximal tibia/fibula segment. The proximal tibia/fibula and distal femur segments were then merged as the ROI for the knee. Using the distal tibia/fibula length as a reference, one-third of the reference above ankle line and one-ninth of the reference below the ankle line were merged as "ankle" for thermal imaging analysis that include tibiotalar and subtalar joints. Mean and 95$^{th}$ percentiles temperatures were recorded for each leg or joint segment. A previous study showed high reproducibility for this technique (ICC 0.936-0.981).

Temperature After Within-limb Calibration (TAWiC) was calculated as the summary measure (mean or 95$^{th}$ percentile) for the joint (knee or ankle) minus the summary measure for mid-tibia. Thus, TAWiC measures how much warmer the joint was than the mid-tibia of the same limb, as shown in Table 4.

TABLE 4

TAWiC: Temperature After Within-limb Calibration. *Handheld (Fluke) camera, smartphone attached (FLIR) camera.

| | Inflamed Joints | | Uninflamed Joints | |
|---|---|---|---|---|
| | Handheld N = 10 | Smartphone Attached N = 10 | Handheld N = 76 | Smartphone attached N = 76 |
| Knee | | | | |
| 95$^{th}$ TAWiC (Anterior) | 1.24 (0.84) | 1.32 (0.85) | −0.19 (0.66) | −0.11 (0.65) |
| 95$^{th}$ TAWiC (Lateral) | 1.40 (0.65) | 1.46 (0.71) | 0.09 (0.47) | 0.13 (0.52) |
| 95$^{th}$ TAWiC (Medial) | 1.14 (0.66) | 1.09 (0.70) | 0.51 (0.67) | 0.47 (0.68) |
| 95$^{th}$ TAWiC (Posterior) | 1.56 (0.44) | 1.44 (0.33) | 1.52 (0.43) | 1.39 (0.41) |
| Mean TAWIC (Anterior) | 0.58 (0.36) | 0.67 (0.43) | −0.36 (0.60) | −0.37 (0.62) |
| Mean TAWIC (Lateral) | 0.45 (0.24) | 0.49 (0.31) | −0.11 (0.48) | −0.10 (0.52) |
| Mean TAWIC (Medial) | 0.51 (0.20) | 0.53 (0.27) | 0.11 (0.47) | 0.16 (0.51) |
| Mean TAWiC (Posterior) | 0.97 (0.30) | 1.07 (0.31) | 1.04 (0.35) | 1.11 (0.35) |
| Ankle | | | | |
| 95$^{th}$ TAWiC (Anterior) | 0.24 (0.54) | −0.36 (0.51) | −0.56 (1.27) | −0.63 (1.04) |
| Mean TAWIC (Anterior) | −0.61 (0.58) | −0.95 (0.89) | −0.91 (0.89) | −1.00 (0.77) |

Demographic information including gender, age, and clinical data including body height, weight, oral or temporal temperatures were collected in all subjects.

Histograms were examined for outliers and non-normality. Demographic variables were summarized for children with JIA and healthy subjects descriptively. Absolute and TAWiC temperatures were summarized by phase (Resting 1, Activity, Resting 2) and camera type (Fluke and FLIR). Paired t-tests were used to compare temperature at initial resting and activities as well as initial resting and final resting in the asymptomatic exercise cohort. In the symptomatic knee pain cohort, paired t-tests were used to compare Fluke and FLIR camera measurements. The mean difference between Fluke and FLIR measurements were summarized by metric with 95% confidence intervals and Bland-Altman plots were used to visualize differences. Analyses were done separately for each view (anterior, lateral, medial, posterior). Sensitivity and specificity of detecting knee arthritis in the asymptomatic exercise cohort were calculated with 95% confidence intervals using derived thresholds. A p-value below 0.05 was considered statistically significant. As this is an exploratory study, p-values were not adjusted for multiple comparisons. All analyses were done using SAS 9.4 (Cary, NC).

18 children from the JIA group and 8 from the healthy group were enrolled in the asymptomatic exercise cohort. 43 children with knee symptoms were enrolled in the symptomatic knee pain cohort. Patient characteristics for the asymptomatic exercise cohort and the symptomatic knee pain cohort were summarized in Table 1. Within the JIA patients in the asymptomatic exercise cohort, the mean duration of disease was four years, and a majority of subjects were on systemic medications and the majority of JIA patients were categorized as polyarticular.

All patients in the asymptomatic exercise cohort were imaged at the knee and the ankle with the handheld (Fluke) camera after initial resting period, after activity, and after second resting period. Comparison of the images of the knees/ankles acquired after resting and after physical activity demonstrated significantly lower temperatures of the joints in both the absolute and TAWiC temperatures with physical activity ($p<0.01$ except the absolute temperature of knee from the lateral view) as demonstrated in Table 2. The second resting period allowed temperatures to return towards pre-activity values though not consistently for all views.

The previously published thresholds for each view to determine the joint disease status based on thermal imaging were used. Both cameras demonstrated similarly high sensitivity (70 to 90%) and specificity (74 to 90%) using the 95$^{th}$ percentile TAWiC from anterior, lateral and medial views. Sensitivity and specificity were lower but similar for anterior, lateral and medial views using the mean TAWiC. Posterior view demonstrated lower sensitivity but high specificity in both the $95^{th}$ percentile and mean as demonstrated in Table 4. The algorithm for the detection of arthritis within ankle was less optimal and the sensitivity and specificity was not calculated.

This study demonstrated the validity of the TAWiC algorithm across different camera platforms and illuminated areas for future optimization and study regarding patient activity prior to camera such as the FLIR camera offers improved feasibility for self-monitoring by patients and families at home and could also be implemented in clinical trials.

In consideration of the impact of physical activity on the accuracy of detection of inflammation, the handheld (Fluke) camera demonstrated variation in analyzed values after patients were active in comparison to being sedentary. The evaluation of the accuracy of a thermal camera in relation to subject activity is important for this application and thus requires further investigation. As demonstrated in the field, thermal imaging of patients with known rheumatoid arthritis varied from that of healthy controls indicating a baseline thermal difference between these two groups. However, optimization and reliable implementation of this technology in both adults and children with arthritis has not yet been established. In this study, a decrease in absolute and relative temperature of the knees and ankles was shown after activity, which persisted after the 10-minute second resting period. This indicates that a consistent and prolonged resting period prior to image acquisition should be strictly required in future studies to optimize detection of inflammatory arthritis. If this technology is to be used in the home setting or a fast-paced primary care office, optimized and strict guidelines would be necessary to ensure true representative images obtained. Further, evaluation of activity-related temperature changes using the FLIR smartphone attached camera is an area of future study.

The smartphone attached (FLIR) camera has much lower resolution and less precision than the handheld (Fluke) camera. However, both cameras performed similarly when evaluating the knees of symptomatic knee pain patients and the study demonstrated excellent correlation of the TAWiC between the handheld (Fluke) and smartphone attached (FLIR) infrared cameras because the deviation of temperature within the joint from less precise FLIR camera offset that within the mid-tibia (internal reference). Additionally, both cameras performed well. We acknowledge that the confidence intervals for the sensitivity and specificity calculations are broad due to small sample size. This could be improved with a larger cohort study involving more patients with active swelling or arthritis. The data demonstrates that the previously validated algorithm utilizing TAWiC temperatures is translatable to a different camera validated algorithm utilizing TAWiC temperatures is translatable to a different camera platform. Similarly, the smartphone attached camera when used in a mouse model of rheumatoid arthritis demonstrated high accuracy and reliability for arthritis detection when compared with conventional measures and was noted to be superior for early detection when compared with conventional measures and was noted to be superior for early phases of the disease.

Notably, the validation of the smartphone attached (FLIR) camera which is available at a lower investment price point may offers expanded use of this technology without compromising the quality of collected images. This may allow for expansion of use of infrared imaging to areas such as in the homes of patients, in primary care offices, and for telemedicine purposes. Future such as in the homes of patients, in primary care offices, and for telemedicine purposes. Future research endeavors to validate the expanded use of thermal cameras beyond the subspecialist office or research lab could include assessment of smartphone attached (FLIR) camera performance and reliability in patient's homes when being used by families. This application performance and reliability in patient's homes when being used by families. This application could allow for family-based monitoring for arthritis flares in patients with an established inflammatory arthritis diagnosis. Based on the excellent sensitivity and specificity of detection of inflammatory arthritis diagnosis. Based on the excellent sensitivity and specificity of detection of arthritis using TAWiC, we surmise that the majority of patients with active arthritis have consistently elevated temperatures until they are adequately treated. However, the day-to-day consistently elevated temperatures until they are adequately treated. However, the day-to-day reproducibility of thermal images remains unknown due to the difficulty of collecting images on the same individuals at the office setting. Smartphone-based cameras offer a convenience and the same individuals at the office setting. Smartphone-based cameras offer a convenient and feasible low-to no-cost solution for long-term repeated measurements for further data collection in the home setting and future studies may reveal the intra-individual variation reliably.

Figure 6:
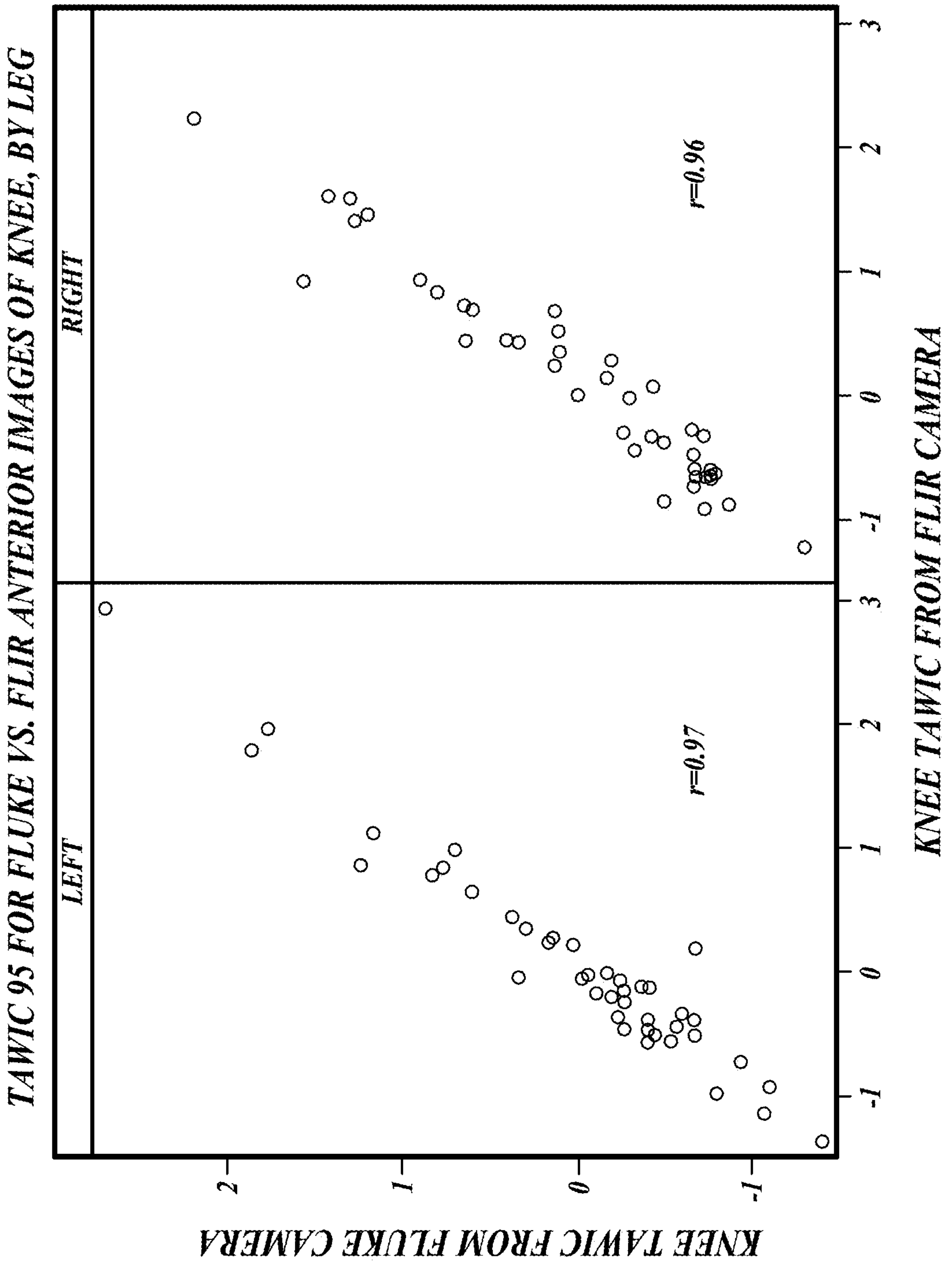
FIG. 6 is a graph showing a temperature after within-limb calibration (TAWiC) 95 for Fluke and Forward Looking InfraRed (FLIR) imaging of a knee, by leg, in accordance with the present technology.

FIG. 6 is a graph showing a Temperature after within-limb calibration (TAWiC) 95 for Fluke and Forward Looking InfraRed (FLIR) imaging of a knee, by leg, in accordance with the present technology. On the horizontal axis is the KneeTAWic measured with the FLIR camera and on the vertical axis is the KneeTAWiC measured with the Fluke camera. Both the right leg (right side of the graph) and the left leg (left side of the graph) are shown. As demonstrated by FIG. 6, both the Fluke and the FLIR camera were able to achieve similar sensitivity and TAWic measurements. Because of this, the method may be performed either in a clinical context, or at home.

Telemedicine has become ever more prevalent in the field of rheumatology and one of the most challenging aspects of telemedicine is the lack of ability to have physical contact with the patient's joints for assessment. However, thermal imaging has the potential to enhance the confidence of joint assessment during telemedicine encounters, which potential to enhance the confidence of joint assessment during telemedicine encounters, which is likely to improve patient care and satisfaction, and access to care. The implementation requires further study for validation and expansion to evaluate joints beyond the knee in the future.

Another potential application of this technology is its use in primary care offices with trained providers. For knee arthritis, the group has validated the algorithm on both handheld Fluke and smartphone attached FLIR ONE PRO systems, which may be considered as an adjunct tool by referring physician. Early detection can be accomplished by screening adjunct tool by referring physician. Early detection can be accomplished by screening symptomatic children at the pediatrician's office. Further study is needed in this area to evaluate accuracy and reliability of image collection and interpretation after standard training of imaging acquisition and image analysis. In all of these settings, threshold setting can be critical to fit the purpose appropriately. Optimization for the use of the smartphone attached (FLIR) camera may vary based on the pretest probability. The sensitivity may be maximized in an in-home setting for patients with pretest probability. The sensitivity may be maximized in an in-home setting for patients with known arthritis due to high pretest probability of arthritis flare. In the primary care clinic setting, a high sensitivity may lead to too many unnecessary subspecialty referrals that saturate the high sensitivity and limited access. Lastly, this application must be population with low pretest probability seem more appropriate. Lastly, this application must be caveated with less reliable detection especially in regard to camera accuracy in the setting of recent physical activity. In the telemedicine setting, specificity optimization may offer the best recent physical activity. In the telemedicine setting, specificity optimization may offer the best detection if the patient is under the care of a rheumatologist with limited access.

While this study demonstrated reliable and accurate detection of inflammation at the knee, the most commonly inflamed joint in children, further development is needed for arthritis detection at other joints such as the ankle as demonstrated. Additionally, the validity of responses of joint temperatures to treatments will need to be examined in future longitudinal research prior to the implementation of this tool in disease activity monitoring. The study identified physical activity as a controllable confounding factor and the equivalent accuracy of TAWiC measurements using a smartphone-based thermal camera which set the foundation for further validation of this tool for disease monitoring in real life.

This study demonstrates validity and robustness of the novel TAWiC algorithm for detecting inflammation in children with active arthritis in the knees or ankles, using two distinct infrared thermal imaging camera platforms. The use of this technology holds high potential for use not only in the hands of rheumatologists but also primary care providers in the community and even families of children with arthritis. This study further supports the feasibility of this approach via use of a more cost-effective smartphone-based platform for infrared thermal imaging for arthritis detection. Author contribution: All authors were involved in drafting the article or revising it critically for important intellectual content, and all authors approved the final version to be published.

This study showed continued validity of the TAWiC algorithm across two distinct thermal camera platforms and demonstrates promise for improved accessibility and utility of this technology for arthritis detection.

Example 3: Feasibility of Applying Infrared Thermal Imaging for Home Monitoring of Arthritis in Children Additional tests were conducted to determine the variability of in-home skin temperature measurements over three days, to compare measurements taken at home versus in the clinic setting.

Children with complaints of knee pain and/or swelling for a week or longer were enrolled and imaged with a smartphone attached FLIR ONE PRO camera and a Fluke handheld camera for evaluation of the presence of inflammation in the office followed by at home imaging with a FLIR camera for 3 consecutive days at home for 3 consecutive days. The joint exam was performed in the office and used as the standard of joint assessment. A previously validated metric of temperature after within-limb calibration (TAWiC), defined as the temperature differences between the knee joint and the ipsilateral mid-tibia, was used for all imaging studies.

As a result, fifty-three patients were enrolled and thirty-eight completed the imaging acquisition at home with analyzable images. When evaluating images of the knee and the mid-tibia region, the images collected at home demonstrated consistently lower absolute temperatures than those acquired in the office setting. However, the calibrated temperature (TAWiC) of the anterior and lateral views of the knee showed mild to moderate correlation across 3 days between home-acquired images and office-acquired images (r=0.58, 0.26, 0.24 and r=0.36, 0.41, 0.42, respectively). The sensitivity and specificity of detecting arthritis of the knee using TAWiC adjustments from previously defined thresholds were essentially the same regardless of the setting of image acquisition (0.44 and 0.79).

This study demonstrates the feasibility of applying TAWiC and use of a smartphone-based infrared thermal camera for arthritis detection through a smartphone-based infrared thermal camera operated by family at home. F and further investigation at a larger scale is needed prior to implementation of this process in the telemedicine setting.

Institutional review board (IRB) approval was obtained from Seattle Children's Hospital. Patients with knee pain and/or swelling for at least a week between the ages of 2 and 18 years, were consented and enrolled. Children with fever, potential confounding cutaneous infections or inability to pose for static imaging were excluded.

As previously described, infrared thermal imaging of the lower limbs from four views (anterior, posterior, medial and lateral) was performed using FLIR™ ONE PRO cameras (Teledyne FLIR LLC, Wilsonvillem, IR) with 19,200 pixels and a detection range from −20 to 400° C., sensitivity ≤0.07° C. (70 mK) and a Fluke™ TiR32 Thermal Imager (Fluke Inc., Everett, WA) with 76,800 pixels (320×240) (detection range −20 to 150° C., sensitivity ≤0.04° C.) by research team at the office after enrollment. Families were then trained on how to take images using their own phones and provided FLIR cameras in the office. Image upload link was provided for them to send collected images from home to the team via REDCap. A video instruction was also shared with family as a reference.

The spatial and temperature data from infrared thermal images were exported from FLIR software. Data were then analyzed using customized semi-automated software developed in Matlab® (Mathworks, Natick, MA) as previously described herein. The thermal data were imported into Matlab® followed by a threshold setting to filter out the background environment pixels. Crosshairs were then placed at the level of knee and ankle to define the length of lower leg which was further divided into three segments equally along the long axis. Another segment of the same length was added above the knee level and merged with the segment immediately below to define the ROI for the knee. Mean and $95^{th}$ greatest temperatures were reported for each segment and the TAWiC of the knee was calculated by subtracting the corresponding mean or $95^{th}$ temperatures in the mid segment of lower leg from that of the knee ROI (as shown and described in FIGS. 5A-5C).

Demographic information including gender, age, and clinical data including body height, weight, oral or temporal temperatures were collected in all subjects. The presence or absence of joint swelling, pain, or warmth were recorded. Laboratory data were also collected if available.

Histograms were examined for outliers and non-normality. Demographic variables were summarized for the population. Absolute and TAWiC temperatures are summarized by location and day (office, at home days 1, 2, 3). Three images per view were obtained per participant at each time point and the mean of these three values was computed to represent the time point. Within-patient standard deviation (representing the standard deviation of three repeated images in office, and at home on each of days 1-3) was compared between the office and at home settings using generalized estimating equations to account for correlation among multiple observations per patient. Pearson's correlation coefficients were calculated to compare at home measurements to in office measures. Mean differences with 95% confidence intervals were calculated by day, comparing each day's at home measurement to the in-office measurement to assess daily patterns using generalized estimating equations methods, accounting for within patient correlation between two legs measured (left and right). Analyses were done separately for each view (anterior, lateral, medial, posterior). Sensitivity and specificity of detecting knee arthritis by day and location were calculated with 95% confidence intervals using derived thresholds. A p-value below 0.05 was considered statistically significant. All analyses were done using SAS 9.4 (Cary, NC).

Fifty-three patients were enrolled in the study and thirty-eight completed the imaging acquisition at home with analyzable images. Thirteen families did not upload the requested images. Two participants were excluded due to the diagnosis of systemic lupus erythematosus or having received intraarticular steroid injection during the initial office visit. Baseline characteristics of participants who completed the home acquisition protocol are summarized in Table 5. Most participants were females (72%) and on average the mean age was 11.8 years old. The majority of participants did not carry have a JIA diagnosis or a diagnosis was unknown at time of image collection (68%, n=26). Those with a JIA diagnosis were largely oligoarticular (18%, n=7), with other JIA categories less represented (3%, n=1).

TABLE 5

Baseline characteristics of children with at home thermal imaging data

| | All Patients N = 38 |
|---|---|
| **Characteristics** | |
| Age of enrollment (years) | 11.8 (4.0) |
| Female | 27 (71.1%) |
| Weight (kg) | 50.0 (22.6) |
| Height (cm) | 149.0 (22.3) |
| BMI | 21.4 (5.4) |
| Oral temperature (° C.) N = 32 | 37.0 (0.3) |
| **ILAR Category** | |
| Persistent oligoarticular | 7 (18.4%) |
| Extended Oligo | 1 (2.6%) |
| RF+ poly | 1 (2.6%) |
| RF− poly | 1 (2.6%) |
| ERA | 1 (2.6%) |
| Psoriatic | 1 (2.6%) |
| Not JIA/Unknown | 26 (68.4%) |
| **Laboratory Findings** | |
| ANA Positive | 12/30 (40%) |
| RF Positive | 1/26 (3.8%) |
| CCP Positive | 3/25 (12.0%) |
| HLA-B27 positive | 2/23 (8.7%) |
| Erythrocyte sedimentation rate mm/h (normal 0-20) N = 30 | 3 (2-7) |
| **Treatment at study entry** | |
| NSAID | 29 (76.3%) |
| DMARD | 3 (7.9%) |
| Biologic | 1 (2.6%) |
| Systemic glucocorticoids | 0 (0.0%) |

*Mean (SD)
**Median (IQR)

The vast majority of the study participants (75%, n=38 out of 51 without other exclusions 40 of 53 patients) were able to effectively obtain at home thermal images suitable for analysis and detection of arthritis with 35 participants collecting all three days, and the remaining three collecting at least one day. This indicates the feasibility of collection of thermal images with appropriate training. One common difficulty encountered in home acquisition was the inclusion of extraneous objects in the acquired images such as pets, which may have affected temperature measurement accuracy.

Thermal measurements obtained by FLIR ONE PRO in the office were not significantly different from those obtained by Fluke Ti32 imager in the office. With the in-home acquisition using only the FLIR camera, image analysis demonstrated that $95^{th}$ absolute and mean absolute temperature measurements decreased on subsequent home imaging days compared to office the measurements taken in the office. Mean TAWiC measurements showed a similar decreasing pattern, while $95^{th}$ TAWiC measurements initially showed a decrease, followed by an increase by day 3 (Tables 6 & 7).

TABLE 6

The comparison of the $95^{th}$ absolute temperature and Temperature After Within-limb Calibration (TAWiC) of the knee joints derived from images obtained in office and at home.

| Total | Office Fluke | Office FLIR | Day 1 at home | | Day 2 at home | | Day 3 at home | |
|---|---|---|---|---|---|---|---|---|
| Number of Joints (N = 76) | Mean (SD) Temperature | Mean (SD) Temperature | Mean (SD) Temperature | Correlation with In-Office | Mean (SD) Temperature | Correlation with In-Office | Mean (SD) Temperature | Correlation with In-Office |
| **Knee** | | | | | | | | |
| $95^{th}$ absolute (Anterior) | 33.71 (1.23) | 31.63 (2.03) | 29.51 (2.42) | 0.08 | 28.97 (3.1) | −0.02 | 27.94 (2.93) | 0.21 |
| $95^{th}$ absolute (Lateral) | 33.34 (1.13) | 33.00 (1.38) | 30.44 (2.22) | 0.20 | 30.2 (2.19) | 0.20 | 30.04 (2.11) | 0.19 |

TABLE 6-continued

The comparison of the 95th absolute temperature and Temperature After Within-limb Calibration (TAWiC) of the knee joints derived from images obtained in office and at home.

| Total | Office Fluke | Office FLIR | Day 1 at home | | Day 2 at home | | Day 3 at home | |
|---|---|---|---|---|---|---|---|---|
| Number of Joints (N = 76) | Mean (SD) Temperature | Mean (SD) Temperature | Mean (SD) Temperature | Correlation with In-Office | Mean (SD) Temperature | Correlation with In-Office | Mean (SD) Temperature | Correlation with In-Office |
| 95th absolute (Medial) | 33.43 (1.15) | 33.11 (1.37) | 30.58 (2.31) | 0.31 | 30.28 (2.28) | 0.22 | 30.13 (2.24) | 0.17 |
| 95th absolute (Posterior) | 33.74 (1.04) | 33.93 (1.28) | 30.96 (2.17) | 0.33 | 30.9 (2.6) | −0.02 | 30.41 (2.43) | 0.01 |
| 95th TAWiC (Anterior) | 0.04 (0.71) | 0.09 (0.71) | 0.03 (0.69) | 0.58 | 0.19 (0.73) | 0.26 | 0.25 (0.81) | 0.24 |
| 95th TAWiC (Lateral) | 0.26 (0.57) | 0.30 (0.59) | 0.43 (0.90) | 0.36 | 0.48 (0.72) | 0.41 | 0.52 (0.72) | 0.42 |
| 95th TAWiC (Medial) | 0.50 (0.71) | 0.49 (0.75) | 0.54 (0.71) | 0.03 | 0.47 (0.64) | 0.09 | 0.69 (0.68) | 0 |
| 95th TAWiC (Posterior) | 1.50 (0.42) | 1.36 (0.38) | 1.39 (0.58) | 0.10 | 1.2 (0.54) | 0.12 | 1.46 (0.56) | 0.03 |
| Mid Tibia | | | | | | | | |
| 95th absolute (Anterior) | 33.68 (1.27) | 31.54 (2.23) | 29.48 (2.12) | −0.06 | 28.78 (2.92) | −0.11 | 27.68 (2.94) | 0.28 |

TABLE 7

The comparison of the mean absolute temperature and Temperature After Within-limb Calibration (TAWiC) of the knee joints derived from images obtained in office and at home.

| Total | Office Fluke | Office FLIR | Day 1 at home with FLIR | | Day 2 at home with FLIR | | Day 3 at home With FLIR | |
|---|---|---|---|---|---|---|---|---|
| Number of Joints (N = 76) | Mean (SD) Temperature | Mean (SD) Temperature | Mean (SD) Temperature | Correlation with In-Office | Mean (SD) Temperature | Correlation with In-Office | Mean (SD) Temperature | Correlation with In-Office |
| Knee | | | | | | | | |
| 95th absolute (Anterior) | 32.27 (1.30) | 30.28 (2.17) | 28.19 (2.58) | 0.08 | 27.61 (3.04) | −0.05 | 26.56 (2.88) | 0.2 |
| 95th absolute (Lateral) | 31.99 (1.19) | 31.71 (1.37) | 29.13 (2.27) | 0.2 | 28.94 (2.2) | 0.13 | 28.75 (2.03) | 0.17 |
| 95th absolute (Medial) | 32.14 (1.21) | 31.9 (1.41) | 29.26 (2.35) | 0.26 | 29.09 (2.29) | 0.15 | 28.87 (2.15) | 0.19 |
| 95th absolute (Posterior) | 32.22 (1.14) | 32.49 (1.38) | 29.5 (2.26) | 0.31 | 29.46 (2.69) | −0.08 | 28.96 (2.46) | 0.03 |
| 95th TAWiC (Anterior) | −0.26 (0.57) | −0.29 (0.68) | −0.33 (0.69) | 0.49 | −0.14 (0.71) | 0.31 | −0.13 (0.72) | 0.33 |
| 95th TAWIC (Lateral) | −0.06 (0.46) | −0.06 (0.47) | 0.05 (0.62) | 0.56 | 0.13 (0.58) | 0.49 | 0.20 (0.55) | 0.32 |

TABLE 7-continued

The comparison of the mean absolute temperature and Temperature After Within-limb Calibration (TAWiC) of the knee joints derived from images obtained in office and at home.

| Total | Office Fluke | Office FLIR | Day 1 at home with FLIR | | Day 2 at home with FLIR | | Day 3 at home With FLIR | |
|---|---|---|---|---|---|---|---|---|
| Number of Joints (N = 76) | Mean (SD) Temperature | Mean (SD) Temperature | Mean (SD) Temperature | Correlation with In-Office | Mean (SD) Temperature | Correlation with In-Office | Mean (SD) Temperature | Correlation with In-Office |
| $95^{th}$ TAWiC (Medial) | 0.18 (0.53) | 0.25 (0.57) | 0.18 (0.49) | 0.19 | 0.25 (0.61) | 0.1 | 0.38 (0.6) | 0.14 |
| $95^{th}$ TAWiC (Posterior) Mid Tibia | 0.95 (0.41) | 0.96 (0.36) | 0.97 (0.56) | 0.22 | 0.85 (0.49) | 0.19 | 1.11 (0.51) | 0.16 |
| $95^{th}$ absolute (Anterior) | 32.53 (1.28) | 30.58 (2.17) | 28.51 (2.19) | −0.06 | 27.75 (2.89) | −0.13 | 26.69 (2.91) | 0.3 |

Correlation between the office and home measurements derived from the images acquired in the office and those at home was overall very weak to moderate using Pearson's correlation coefficients, ranging from −0.06 to 0.58, with the highest correlation seen with mean and $95^{th}$ anterior TAWiC. For example, $95^{th}$ TAWiC anterior measurements demonstrated 0.58, 0.26 and 0.24 correlation with office measurements on day 1, 2, and 3, respectively. Correlation generally down trended over the subsequent days of home measurements. Within patient standard deviation, representing the precision of multiple images taken consecutively in each setting, was consistently higher in the at home setting than in the office. This difference was statistically significant at an alpha=0.05 for all absolute temperatures, however the difference was smaller for TAWiC measurements and was not statistically significant for either mean or $95^{th}$ percentile TAWiC measured via the anterior or posterior views, adding to the evidence of TAWiC's robust utility.

Sensitivity and specificity of detecting arthritis calculations were calculated by using completed for the $95^{th}$ TAWiC anterior view for office and home acquired images (Table 8). Sensitivity was comparable among home and office measurements, ranging from 44% in the office to up to 56% at home on day 3. Specificity was notably higher than sensitivity, ranging from 79% in the office, up to 85% on home imaging on day 1.

TABLE 8

In Office and At Home sensitivity and specificity for detection of arthritis using $95^{th}$ TAWiC anterior View Measurement

| Knee | Office Fluke | Office FLIR | Day 1 Home with FLIR | Day 2 Home with FLIR | Day 3 Home with FLIR |
|---|---|---|---|---|---|
| Sensitivity (95% CI) | 44.4% (13.7%-78.8%) | 44.4% (13.7%-78.8%) | 44.4% (13.7%-78.8%) | 44.4% (13.7%-78.8%) | 55.6% (21.2%-86.3%) |
| Specificity (95% CI) | 85.1% (74.3%-92.6%) | 79.1% (67.4%-88.1%) | 85.1% (74.3%-92.6%) | 73.1% (60.9%-83.2%) | 71.6% (59.3%-82.0%) |

The results of this study demonstrated that most families were able to complete an online tutorial and successfully procured analyzable images. In developing this study, we identified potential barriers to executing the use of a home smartphone-based infrared thermal imaging of joints at home including such as the equipment cost, a lack of standardizing protocol of imaging acquisition by families, and the burden of imaging uploading and imaging analysis. Some imaging results may have been adversely affected by having pets and highly thermally conductive metal objects (e.g., doorknobs, lamps, etc.) positioned near the joint region of interest. Development of future standardized protocols should identify these hazards background noises to optimize accurate thermal imaging acquisition.

Considering the reliability of home obtained images, the family obtained FLIR ONE PRO infrared thermal images from a FLIR ONE PRO infrared thermal camera in a home setting displayed moderate correlation with images obtained by research staff in the office setting when comparing TAWiC values from anterior and lateral images. Furthermore, sensitivity and specificity tests for detection of arthritis were similar between the home and office-acquired images. On the other hand, the correlation of absolute temperature was very weak or weak. This could be due to trends showing the absolute temperatures of knees and mid-tibia (mean and $95^{th}$ percentile) were consistently lower at home compared to that was acquired in the office, although TAWiC values were similar. These results suggest that TAWiC is more robust than the absolute temperature in detecting arthritis, which is independent of the mild fluctuation of the environmental temperatures may provide more accurate home measurements over absolute temperatures.

The possible incongruity of the absolute temperatures could be due to variation in home temperatures with an average home temperature being lower than the office temperature, although home temperature settings or measurements were not obtained as part of this study to confirm this hypothesis. However, the TAWiC measurement overcame the variation of absolute temperature and led to robust determination of arthritis comparably at home as in the office. Other factors that may lead to fluctuations in absolute or TAWiC temperatures could include circadian rhythm, and circa mensal rhythms. Body temperatures tend to be the highest during mid-afternoon and fall in the evening. If families are obtaining temperature readings after school, it may explain the lower mean absolute temperatures obtained in the home setting. Another factor that could explain the higher skin temperatures in the office setting could be due to stress, as it has been shown that core body temperatures and skin temperatures rise in certain body regions when study participants are exposed to stress. Regional changes in the temperature over joints secondary to psychological stress have not been specifically studied, and no formal stress testing was done during the study clinic visit. Lastly, time after exercise duration of resting prior to imaging, and administration of medications with antipyretic effects could also affect temperature measurements. Instructions for families to collect images at a consistent time of day after adequate resting, preferably in the morning may mitigate this issue in future studies.

By demonstrating families' ability to acquire thermal images of the joints at home, this study added a strong evidence as is a proof of concept towards future implementation. Further research may focus on removing the variables that may lead to an inconsistency between home and office images. Examples of this include having families acquire thermal images immediately after research staff have imaged the joints in the office environment to confirm the accuracy of the family-obtained temperatures, providing a mini kit including a backdrop, or developing protocols that standardize or account for home temperature and acquisition time of day differences.

This study demonstrates the feasibility of using thermal imaging in the home setting, with the majority of families successfully acquiring and uploading analyzable thermal images. There was moderate correlation between home vs office TAWiC measurements of the anterior leg, though the study protocol was not rigorously developed to limit confounding variables. Future studies will be necessary to improve accuracy and precision of thermal images obtained by a smartphone based FLIR ONE PRO in the home setting.

The complete disclosure of all patents, patent application, and publications, and electronically available material cited herein are incorporated by reference in their entirety. Supplementary materials references in publications (such as supplementary tables, supplementary figures, supplementary materials and methods, and/or supplementary experimental data) are likewise incorporated by references in their entirety. In the event that any inconsistency exists between the disclosure of the present application and the disclosure (s) of any document incorporated herein by reference, the disclosure of the present application shall govern. The foregoing detailed description and examples have been given for clarity of understanding only. No unnecessary limitations are to be understood therefrom. The technology is not limited to the exact details shown and described, for variations obvious to one skilled in the art will be included within the technology defined by the claims.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure.

Specific elements of any foregoing embodiments can be combined or substituted for elements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present technology. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the technology are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

All of the references cited herein are incorporated by reference. Aspects of the disclosure can be modified, if necessary, to employ the systems, functions, and concepts of the above references and application to provide yet further embodiments of the disclosure. These and other changes can be made to the disclosure in light of the detailed description.

It will be appreciated that, although specific embodiments of the technology have been described herein for purposes of illustration, various modifications may be made without deviating from the spirit and scope of the technology. Accordingly, the technology is not limited except as by the claims.

What is claimed is:

1. A method for determining a presence of arthritis in a patient, comprising:

obtaining a first image of the patient's joint with a first camera, wherein the first image is a visible light image;

determining an outline of the patient's joint from the first image with a processor, wherein determining an outline of the patient's joint from the first image comprises:

identifying a first joint of the patient;

identifying a second joint of the patient;

dividing an area between the first joint and the second joint into a plurality of parts, wherein each part of the plurality of parts are equal in size;

reflecting a first part of the plurality of parts along a line at a first reference point;

combining the first part and the reflected first part into a contiguous area;

assigning the contiguous area as the patient's joint; and defining an outline of the contiguous area as the outline of the patient's joint, determining an outline of a reference area from the first image, wherein the patient's joint is adjacent to the reference area;

obtaining a second image of the patient's joint with a thermal camera, wherein the second image is a thermal light image;

determining an outline of the patient's joint in the second image;

determining an outline of a reference area from the second image, wherein the patient's joint is adjacent to the reference area;

determining a first representative topological temperature within the outline of the patient's joint of the first image from the second image; and determining a second representative topological temperature within the outline of the reference area of the first image from the second image;

comparing the first representative topological temperature and the second representative topological temperature; and determining a likelihood of the presence of arthritis within the patient's joint based on comparing the first representative topological temperature and the second representative topological temperature.

2. The method of claim 1, wherein the first representative topologic temperature is a percentile, an average, a mean, a median, or a maximum temperature within the outline of the patient's joint.

3. The method of claim 1, wherein the second representative topologic temperature is a percentile, an average, a mean, a median, or a maximum temperature within the outline of the patient's joint.

4. The method of claim 1, wherein comparing the first and second topological temperature comprises subtracting the first topological temperature from the second topological temperature.

5. The method of claim 1, wherein comparing the first and second topological temperature comprises forming a ratio between the first topological temperature and the second topological temperature.

6. The method of claim 1, wherein the joint is selected from a group consisting of a knee, a finger, an ankle, a wrist, an elbow, and a toe joint.

7. The method of claim 1, wherein the first image and the second image are acquired simultaneously with a single camera.

8. The method of claim 1, wherein the first image and the second image are acquired simultaneously with a set of cameras.

9. The method of claim 1, wherein determining an outline of a reference area from the first image comprises:

assigning a middle part of the plurality of parts as the reference area, wherein when the plurality of parts is an even number of parts, the middle part is two middle parts combined as a contiguous middle part; and defining an outline of the middle part as the outline of the reference area.

10. The method of claim 1, wherein the first reference point is a knee of the patient, and the second reference point is an ankle of the patient.

11. The method of claim 1, wherein the first reference point is an elbow of the patient, and the second reference point is a wrist.

12. A system for determining a presence of arthritis in a patient, comprising:

a first camera configured to obtain a first image of a patient's joint, wherein the first image is a visible light image;

a second camera configured to obtain a second image of the patient's joint, wherein the second image is a thermal light image; and a processor communicatively coupled to the first and second camera, wherein the processor is configured for:

identifying a first reference point of the patient;

identifying a second reference point of the patient;

dividing an area between a first joint and a second joint into a plurality of parts, wherein each part of the plurality of parts are equal in size;

reflecting a first part of the plurality of parts along a line at the first reference point;

combining the first part and a reflected first part into a contiguous area;

assigning the contiguous area as the patient's joint;

defining an outline of the contiguous area as the outline of the patient's joint;

determining an outline of a reference area from the image, wherein the patient's joint is adjacent to the reference area;

determining a first representative topological temperature within the outline of the patient's joint;

determining a second representative topological temperature within the outline of the reference area;

comparing the first representative topological temperature and the second representative topological temperature; and determining a likelihood of the presence of arthritis within the patient's joint based on comparing the first representative topological temperature and the second representative topological temperature.

13. The system of claim 12, wherein the first camera and the second camera are a single camera.

14. The system of claim 12, wherein the first representative topologic temperature is a percentile, an average, a mean, a median, or a maximum temperature within the outline of the patient's joint.

15. The system of claim 12, wherein the second representative topologic temperature is a percentile, an average, a mean, a median, or a maximum temperature within the outline of the patient's joint.

16. The system of claim 12, wherein the processor is further configured for:

assigning a middle part of the plurality of parts as the reference area, wherein when the plurality of parts is an even number of parts, the middle part is two middle parts combined as a contiguous middle part; and defining an outline of the middle part as the outline of the reference area.

17. A non-transitory computer-readable medium having computer executable instructions stored thereon that, if executed by one or more processors of a computing device, cause the computing device to perform one or more steps for detection of arthritic symptoms using visible light and thermal light images, comprising:

obtaining a first image of a patient's joint, wherein the first image is a visible light image;

obtaining a second image of the patient's joint, wherein the second image is a thermal light image;

identifying a first reference point of the patient;

identifying a second reference point of the patient;

dividing an area between the first joint and the second joint into a plurality of parts, wherein each part of the plurality of parts are equal in size;

reflecting a first part of the plurality of parts along a line at the first reference point;

combining the first part and a reflected first part into a contiguous area;

assigning the contiguous area as the patient's joint;

defining an outline of the contiguous area as the outline of the patient's joint;

determining an outline of a reference area from the first image, wherein the patient's joint is adjacent to the reference area;

determining a first representative topological temperature within the outline of the patient's joint of the first image from the second image;

determining a second representative topological temperature within the outline of the reference area of the first image from the second image;

comparing the first representative topological temperature and the second representative topological temperature; and determining a likelihood of the presence of arthritis within the patient's joint based on comparing the first representative topological temperature and the second representative topological temperature.

* * * * *